(12) United States Patent
Gaal

(10) Patent No.: US 6,775,802 B2
(45) Date of Patent: Aug. 10, 2004

(54) METHOD, APPARATUS, AND SYSTEM FOR SIGNAL PREDICTION

(75) Inventor: Peter Gaal, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 405 days.

(21) Appl. No.: 09/905,266

(22) Filed: Jul. 13, 2001

(65) Prior Publication Data

US 2002/0049536 A1 Apr. 25, 2002

Related U.S. Application Data

(60) Provisional application No. 60/223,670, filed on Aug. 8, 2000.

(51) Int. Cl.[7] .......................... H03M 13/00; H04B 7/185
(52) U.S. Cl. ................................. 714/758; 342/357.08
(58) Field of Search ............................... 714/752, 758, 714/800; 342/357, 352, 357.06–357.09; 701/213; 455/12.1, 427

(56) References Cited

U.S. PATENT DOCUMENTS

| | | | |
|---|---|---|---|
| 5,731,786 A | * 3/1998 | Abraham et al. | ...... 342/357.08 |
| 5,798,732 A | 8/1998 | Eshenbach | ................... 342/357 |
| 5,847,680 A | 12/1998 | McBurney | ................... 342/357 |
| 6,118,977 A | * 9/2000 | Vannucci | ................... 455/12.1 |
| 6,252,545 B1 | 6/2001 | Da et al. | ................. 342/357.1 |
| 6,295,023 B1 | * 9/2001 | Bloebaum | ............... 342/357.06 |

FOREIGN PATENT DOCUMENTS

| | | | |
|---|---|---|---|
| EP | 1008862 | 6/2000 | ............. G01S/5/14 |
| GB | 1008862 A1 | * 6/2000 | ............. G01S/5/14 |
| WO | 9957573 | 11/1999 | ............. G01S/1/04 |
| WO | 0153849 | 7/2001 | ............. G01S/5/14 |

OTHER PUBLICATIONS

Dr. K. Deergha Rao, RLS–based predictor for latency compensation in DGPS, 1–2000, IEEE Trans on Areospace and Electronic Systems vol. 36, No. 1, p. 339–343.*

* cited by examiner

*Primary Examiner*—Shelly A Chase
(74) *Attorney, Agent, or Firm*—Philip Wadsworth; Charles Brown; Richard Bachand

(57) ABSTRACT

An apparatus, method, and system for predicting subframes of Global Positioning System (GPS) signals. The apparatus include a processor capable of determining whether a subframe is an almanac subframe, setting a timehead and adding it to a time-of-week (TOW), setting a telemetry (TLM) message based on value of the TOW, generating a Cyclic Redundancy Code (CRC) for a predicted subframe, and a memory for storing the predicted subframe. The memory may vary in size based on the number of predicted subframes. The processor is further capable of determining whether the value of the TOW is less than the number of seconds in a week, calculating a position of the predicted subframe in the memory, and setting a valid flag.

38 Claims, 42 Drawing Sheets

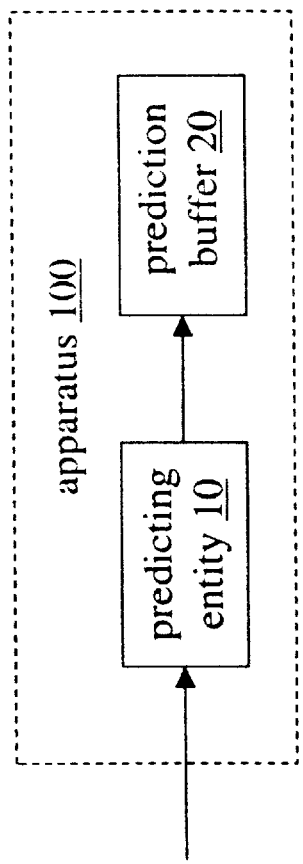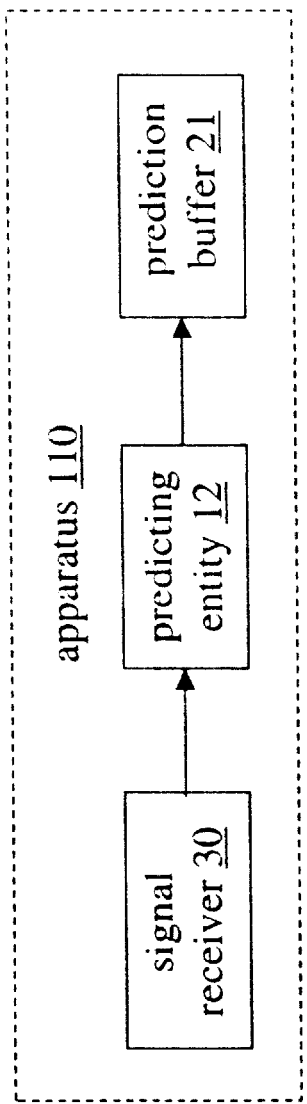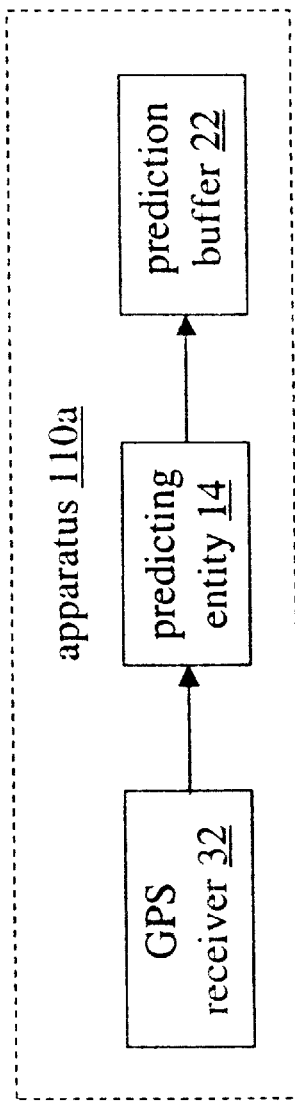

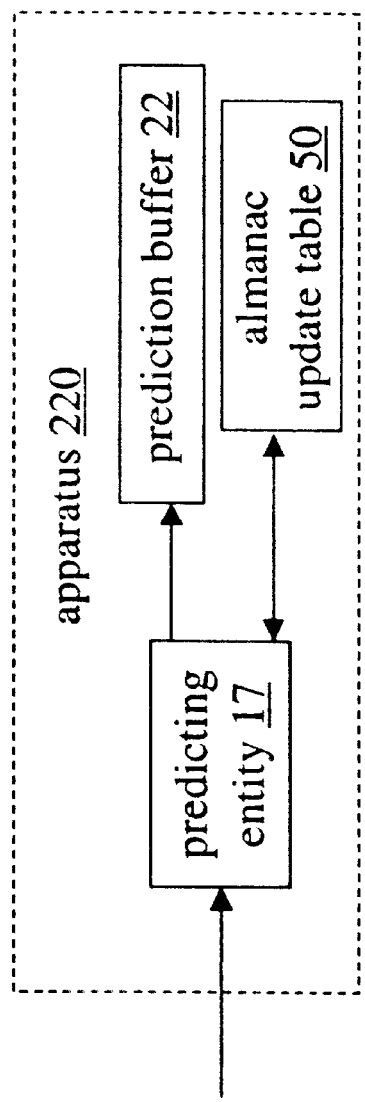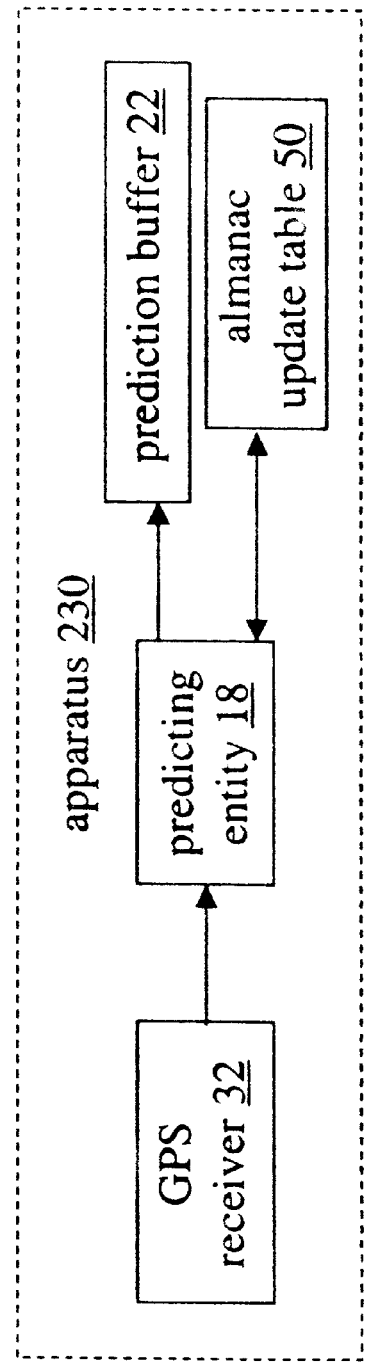

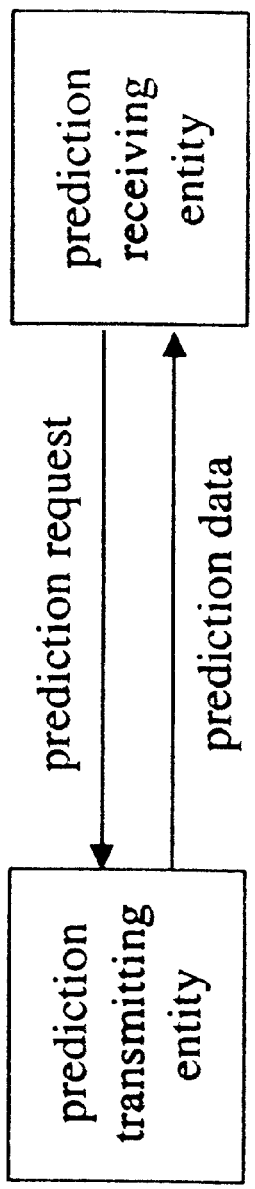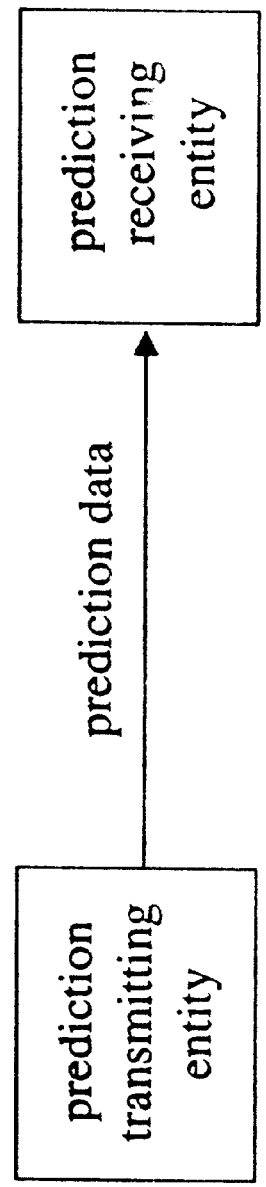

METHOD, APPARATUS, AND SYSTEM FOR SIGNAL PREDICTION

RELATED APPLICATIONS

This application claims priority to U.S. Provisional Application No. 60/223,670, entitled "Method, Apparatus, And System Of Improving GPS Signal-To-Noise Ratio," filed Aug. 8, 2000.

BACKGROUND OF THE INVENTION

1. Field of the Invention

The present invention relates to reception of signals from known sources, and more specifically to predicting the content of signals received from known sources.

2. Description of Related Art

Ease and accuracy of position and time determination has increased significantly since the development of the well-know Navigation Satellite Timing and Ranging (NAVSTAR) Global Positioning Satellite (GPS) System. The NAVSTAR GPS system is described in Global Positioning System Standard Positioning Service Signal Specification, 2nd edition, Jun. 2, 1995, United States Coast Guard Navigation Center, Alexandria, Va. Another such system is the Global Navigation Satellite System (GLONASS) GPS system maintained by the Russian Republic. GPS receivers are currently available for use in aircraft, ships, and ground vehicles and for hand carrying by individuals.

The NAVSTAR GPS system provides for thirty-two satellites or 'space vehicles' (SVs) that orbit the earth in six orbital planes (four satellites, plus spares, in each plane). Each SV orbit repeats almost the same ground track each day as the earth turns beneath the SVs of the system. The orbital planes are equally spaced and inclined with respect to the equatorial plane, thus ensuring that a line-of-sight path exists to at least five SVs from any (unobstructed) point on the earth.

Ground-based monitor stations measure signals from the SVs and incorporate these measurements into orbital models for each satellite. Orbital data and SV clock corrections are computed for each satellite from these models and uploaded to each SV. The SV then transmits information relating to its position at a data rate of 50 bits per second, via BPSK modulating a direct sequence spread spectrum signal having a chip rate of 1.023 MHz that is modulated onto an RF carrier, with each SV using a different spreading code (also called a Gold code or a coarse acquisition or C/A code). Hereinafter the information carried on the signal transmitted by a SV is called 'navigation data.'

A GPS receiver calculates its position by combining navigation data that indicates the position of the SVs with the delay or phase of the signal received from the SVs (which indicates the distance between the receiver and the SVs). Because of inaccuracies in the receiver's timebase oscillator, signals from at least four SVs are required to resolve a position in three dimensions, although signals from additional SVs (if available) may be used to provide better accuracy.

It is desirable to augment certain wireless systems for mobile communications by adding the capability to locate the position of a particular mobile unit. One reason is a regulation promulgated by the Federal Communications Commission (FCC) (Docket No. 94-102, Third Report and Order adopted Sep. 15, 1999, released Oct. 6, 1999) which requires all cellular carriers in the United States to be able to locate the position of a cellular telephone making an emergency 911 call within 50 meters for 67 percent of calls and within 150 meters for 95 percent of calls by October 2001. Other uses for position location capability in wireless communications systems include value-added consumer features such as navigation and vehicle fleet management support.

One possible approach to supporting position location in a wireless communications system is to add GPS location capabilities to the mobile units. However, GPS receivers generally require unobstructed, strong signals, which may not be available to a mobile unit. GPS signal detection under unfavorable SNR conditions (for example, inside a building or vehicle where no direct line of sight can be established from the receiver to at least four SVs) is a continuing problem.

In order to detect the GPS signal at the receiver, a matched filter may be used to generate the spreading code and apply it to the received signal in a search for a correlation peak. This method is called coherent integration. Short coherent integration denotes integration over a period of less than one data bit (in the case of a GPS signal, less than 20 milliseconds), while long coherent integration denotes integration over a period of more than one data bit. It may be desirable to apply long coherent integration, as a longer integration period may allow for a higher processing gain.

One drawback to using long coherent integration on a signal such as a GPS signal is that the data modulated onto it may integrate to produce an output of low or zero magnitude. In other words, if each binary data symbol that is modulated onto the signal (expressed herein as '0' or '1') appears as frequently as the other binary data symbol during the integration period, then the output of the matched filter over the integration period will sum to zero and no signal will be detected. Even if the data symbols sum to a nonzero value, the resulting receiver performance will be severely reduced in most cases.

U.S. Pat. No. 6,118,977, issued to Vannucci, discloses a method where the known GPS navigation data is used in a mobile receiver to generate a local replica of the transmitted signal, which includes representation of the data modulation on the signal. This allows the mobile receiver to correlate the received signal utilizing long coherent integration period without experiencing the output degradation explained above. The method of Pat. No. '977 requires carrying out the processing steps described subsequently in this paragraph. The mobile receiver stores processed data samples of the received signal to a FIFO memory for later off-line processing. An auxiliary system, which has unobstructed view of all SVs above the horizon, receives GPS signals at the same time with the mobile receiver and demodulates the transmitted navigation data bits. The auxiliary system conveys the demodulated navigation data bits to the mobile receiver. The mobile receiver off-line processes the stored data samples, utilizing the navigation data bits conveyed to it by the auxiliary system.

Unfortunately, the memory capacity needed for storing processed data samples in the mobile receiver makes the method of Pat. No. '977 impractical. The required memory capacity is dictated by the data sampling rate, the coherent integration length, the number of SVs and the number of code phase and Doppler hypotheses for which signal search is attempted simultaneously. Note that a typical mobile receiver cannot detect signals from both the SVs and the auxiliary unit at the same time, thus, the required memory capacity cannot be reduced by cyclic operation (i.e. when the same memory cell is reused for storing different segments of the received signal while maintaining coherent integration).

Thus, there is a need for a method, apparatus and system that would allow a receiver to perform long coherent integration on signal receivers without the undue burden of having to incorporate large-scale memory devices in those receivers.

SUMMARY

BRIEF DESCRIPTION OF THE DRAWINGS

FIGS. 8A–C show block diagrams of apparatus according to embodiments of the invention.

FIGS. 16E and 16F show block diagrams of apparatus according to embodiments of the invention.

FIG. 25A is a block diagram of a system according to an embodiment of the invention.

FIG. 25B is a block diagram of a system according to another embodiment of the invention.

DETAILED DESCRIPTION

Throughout the course of this disclosure, the term "exemplary" should be interpreted to indicate one example or one instance and not to imply that there is any preference for that particular exemplar.

A priori knowledge of the data carried by a received signal may be applied to support long coherent integration. If the sequence of binary data symbols in a signal (e.g. the navigation data in a GPS signal) were known, then the problem of performance degradation due to data symbol integration during long coherent integration could be avoided, and better receiver performance could be achieved. Such process will also be called "modulation wipe-off" hereinafter. For example, modulation wipe-off could be applied to GPS data reception by predicting the navigation data.

Figure 1:
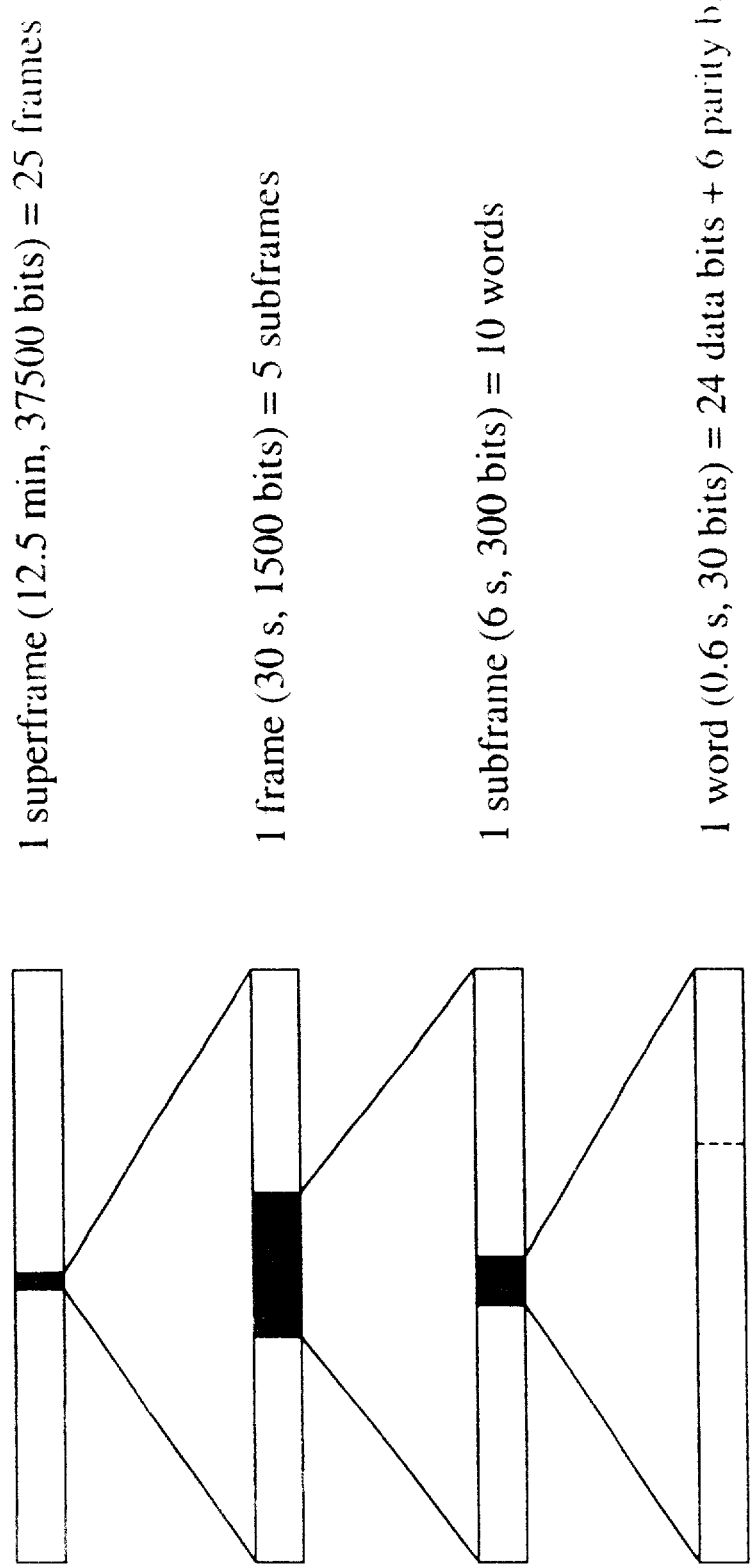
FIG. 1 illustrates various divisions of a GPS data message.

As shown in FIG. 1, a NAVSTAR GPS (hereinafter 'GPS') data frame comprises 1500 bits transmitted over a period of 30 seconds (i.e., at a rate of 50 bits per second). A GPS data message is transmitted over a block of twenty-five frames (commonly referred to as a "superframe"). Each frame within a superframe is divided into five 300-bit subframes. Accordingly, at a rate of 50 bits per second, each subframe has a duration of six seconds. Each subframe is further divided into ten 30-bit words, each word containing 24 bits of data and a 6-bit code string (commonly a cyclic redundancy code (CRC) checksum). The GPS CRC algorithm may be expressed as follows:

checksum bit 1=XOR{data bits 1, 2, 3, 5, 6, 10, 11, 12, 13, 14, 17, 18, 20, 23};

checksum bit 2=XOR{data bits 2, 3, 4, 6, 7, 11, 12, 13, 14, 15, 18, 19, 21, 24};

checksum bit 3=XOR{data bits 1, 3, 4, 5, 7, 8, 12, 13, 14, 15, 16, 19, 20, 22};

checksum bit 4=XOR{data bits 2, 4, 5, 6, 8, 9, 13, 14, 15, 16, 17, 20, 21, 23};

checksum bit 5=XOR{data bits 1, 3, 5, 6, 7, 9, 10, 14, 15, 16, 17, 18, 21,22, 24};

checksum bit 6=XOR{data bits 3, 5, 6, 8, 9, 10, 11, 13, 15, 19, 22, 23, 24};

where data bit 1 and checksum bit 6 are the leftmost and rightmost bits, respectively, of a word as shown in FIG. 1, and XOR{•} indicates the modulo-2 sum of the quantities within the brackets. Other signal formats may use one or more other error-detecting code algorithms to produce checksums. These checksums may appear at the beginning or in the middle of a data word, for example, or may be interleaved with other bits of the word.

Each bit of a GPS subframe (including the bits of the CRC checksum) is also parity covered before transmission by XORing it with a specified one of the last two bits of the checksum of the previous word (as transmitted) as follows:

transmitted bit 1=(data bit 1) XOR (previous transmitted bit 30);

transmitted bit 2=(data bit 2) XOR (previous transmitted bit 30);

transmitted bit 3=(data bit 3) XOR (previous transmitted bit 30);

. . .

transmitted bit 24=(data bit 24) XOR (previous transmitted bit 30);

transmitted bit 25=(checksum bit 1) XOR (previous transmitted bit 29);

transmitted bit 26=(checksum bit 2) XOR (previous transmitted bit 30);

transmitted bit 27=(checksum bit 3) XOR (previous transmitted bit 29);

transmitted bit 28=(checksum bit 4) XOR (previous transmitted bit 30);

transmitted bit 29=(checksum bit 5) XOR (previous transmitted bit 30);

transmitted bit 30=(checksum bit 6) XOR (previous transmitted bit 29).

Other signal formats may use a different encoding, covering, or encryption scheme. Likewise, in another format only a portion of the bits of a data string may be encoded. Additionally, the GPS error-detecting and parity covering operations outlined above may be expressed in other forms (for example, they may be combined into a single operation producing an equivalent result, as described in section 2.5.2 of the GPS Standard document cited above and diagrams referenced therein).

Figure 2:
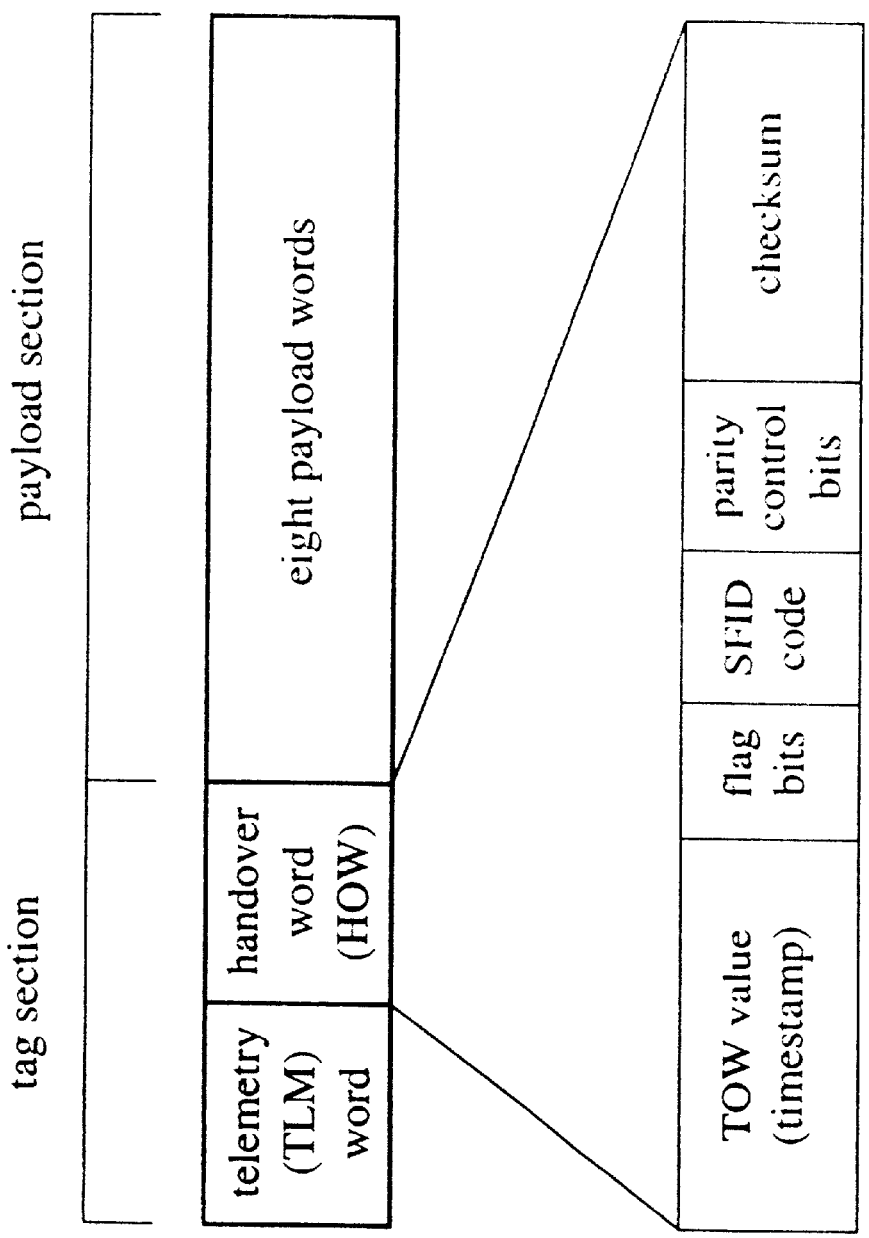
FIG. 2 illustrates the structure of a GPS subframe and the structure of a GPS handover word.

As shown in FIG. 2, each GPS subframe comprises in sequence a string (called a telemetry or 'TLM' word), a handover word, and eight message words. The handover word (or "HOW") comprises in sequence a seventeen-bit timestamp called a time-of-week (or "TOW") value, two flag bits, a three-bit subframe identification (or 'SFID') code indicating the position of the subframe within the frame, two parity control bits, and the six-bit checksum. The parity control bits (i.e. bits 23 and 24 of the HOW) are selected such that the final two bits of the checksum (i.e. bits 5 and 6 of the checksum, or bits 29 and 30 of the HOW) will be zero. Because the tenth (last) word of each subframe also has parity control bits at these locations, the parity covering operation described above will not alter the first and third words of a GPS subframe. In a method according to an embodiment of the invention, this effect may be applied to prevent data errors from propagating beyond subframe boundaries (e.g. by forcing the last two bits of a subframe to have values of zero).

Figure 3:
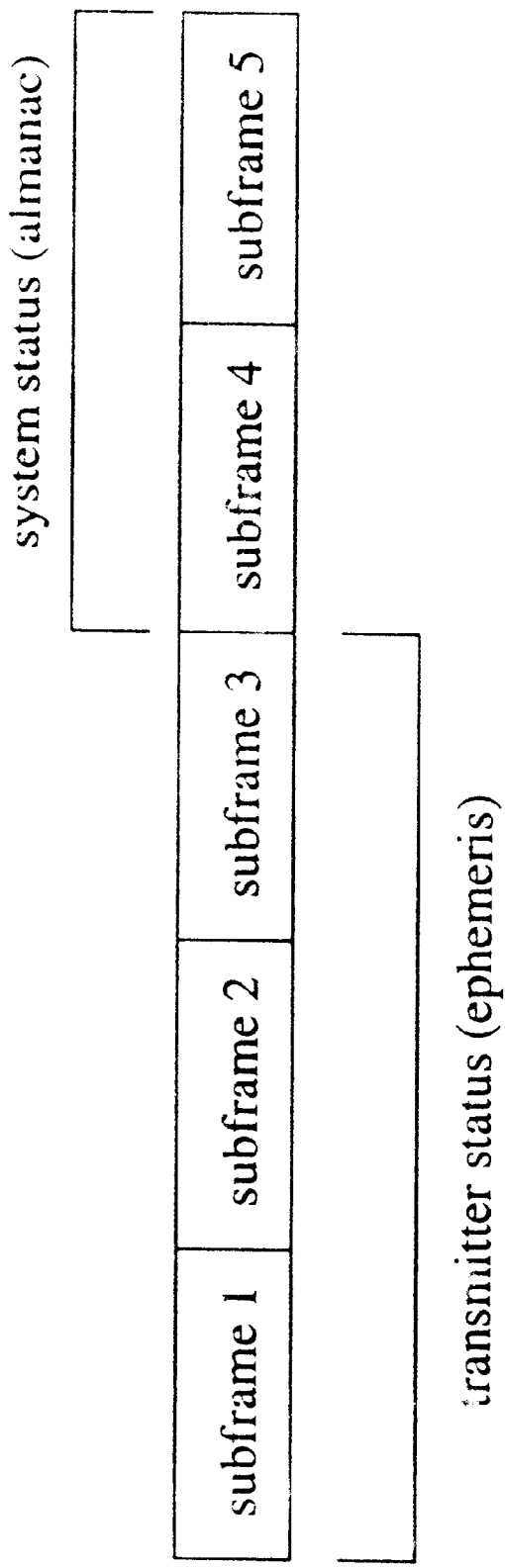
FIG. 3 illustrates the division of a GPS frame into a transmitter status(or ephemeris) group of subframes and a system status (or almanac) group of subframes.

As shown in FIG. 3, each subframe of a GPS frame may indicate transmitter status or system status. Specifically, the message words of the first three subframes of each GPS data frame (which comprise the transmitter status group) contain orbital and clock data for the transmitting SV. Subframe 1 contains clock corrections and health information relating to the transmitting SV, and subframes two and three contain precise orbital data sets (also called 'ephemeris data') for the transmitting SV. Hereinafter, the message data of subframes 1–3 is called the "ephemeris data set." In the absence of data updates, the SV-specific ephemeris data set repeats at every frame.

Subframes four and five comprise the system status group, and the message words of these subframes contain almanac and other data that is common to all of the satellites. In the absence of data updates, the system-wide almanac data set repeats only every superframe (i.e. every twenty-five frames or 125 subframes). Therefore, a complete data message is transmitted by a SV every 12.5 minutes. [For a more detailed description of the NAVSTAR GPS system, see, e.g., Global Positioning System: Theory and Applications (Volume I), edited by B. W. Parkinson and J. J. Spilker Jr., 1996.]

Figure 4:
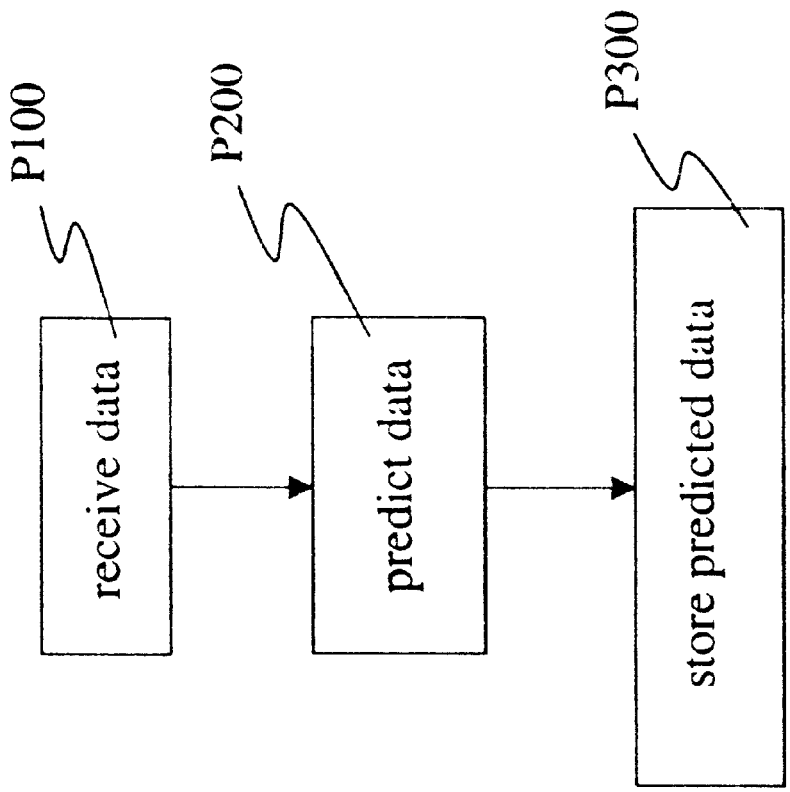
FIG. 4 is a flowchart of a method of predicting data according to an embodiment of the invention.

FIG. 4 shows a flow chart for a method for predicting data according to an embodiment of the invention. In task P100, data is received (e.g. navigation data is received from a SV). In task P200, "future" data (e.g. data to be received in the future) is predicted based on at least the received data, and in task P300, the predicted future data is stored.

Figure 5:
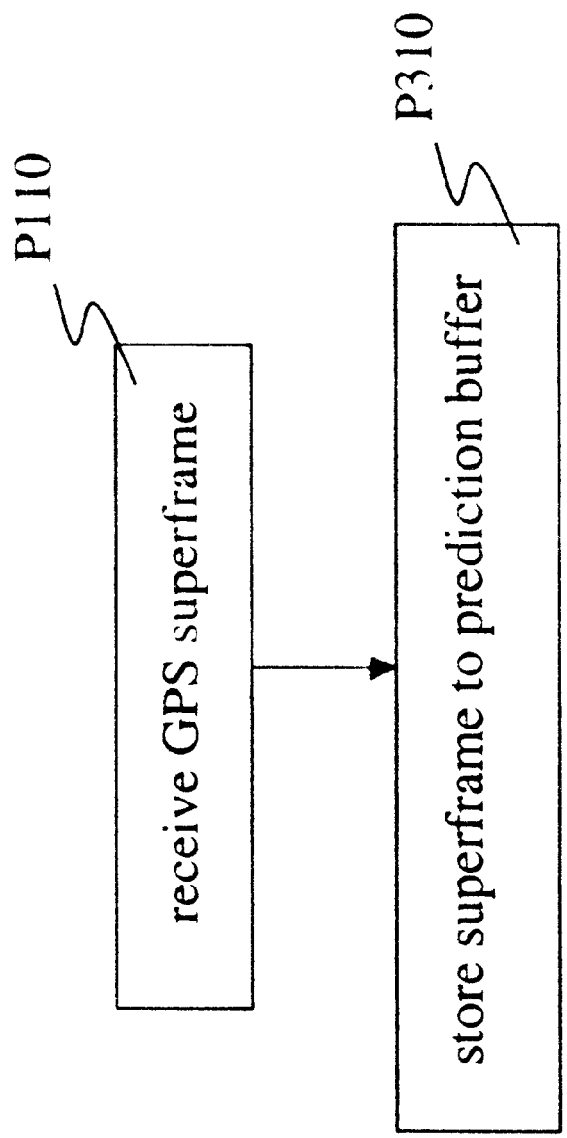
FIG. 5 is a flowchart of a method of predicting data according to another embodiment of the invention.

Assuming that no data updates occur, most of the data in a superframe may be expected to be the same as the data in the previous superframe. Given any sequence of 125 consecutive subframes, therefore, the next 125 subframes may be expected to be largely the same. FIG. 5 shows a method for predicting data according to another embodiment of the invention. In task P110, a GPS superframe is received. In task P310, since there is little change in the content of two adjacent superframes transmitted one after another, the received superframe is stored to a buffer (hereinafter called a 'prediction buffer') as a prediction of a superframe to be transmitted by the SV at a later time, and typically as a prediction of the next superframe). It should be noted that the further into the future the prediction is used, the less accurate the prediction will be. Therefore, the most recently received superframe is most accurately used to predict the next superframe to be received. The predicted future data (i.e., the previously received superframe) is stored in a prediction buffer. Task P310 may occur contemporaneously with task P110 such that at least a portion of the predicted data will be available before the entire superframe has been received.

Figure 6:
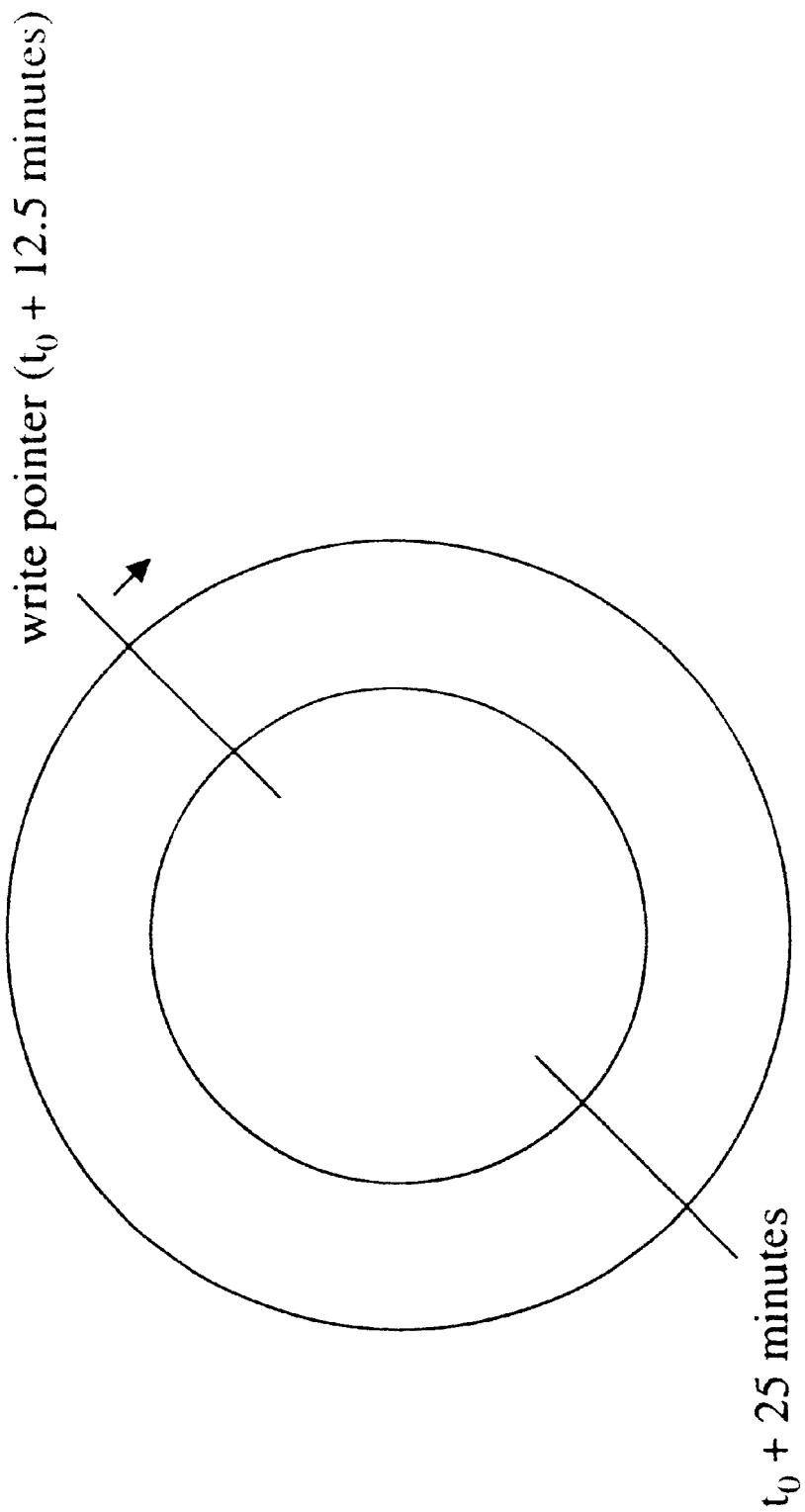
FIG. 6 illustrates a principle of operation of a prediction buffer.

FIG. 6 shows one example of the operation of a prediction buffer suitable for use with a method as shown in FIG. 4 or 5. The prediction buffer of this example may be implemented as a circular queue (also called a "ring buffer"). In a particular example, the buffer has a capacity of two GPS superframes (i.e. 250 subframes, or 25 minutes of navigation data). The predicted data bits are written to the buffer at locations as indicated by a write pointer, which traverses the buffer in one direction only. Once the buffer has been filled, further writing operations will overwrite the data previously stored at the written locations. In a method as shown in FIG. 5, the write pointer may indicate an effective time that is 12.5 minutes (i.e. one GPS superframe) in advance of $t_0$, where $t_0$ is defined as the time at which the observed data (corresponding to the predicted data being written) was received.

Using a buffer as shown in FIG. 6, predicted data may be supplied for any part of a time window that spans from $t_0$ to 25 minutes (i.e. two GPS superframes) past $t_0$. This twenty-five-minute window may be arbitrarily extended (or reduced) by a simple change in buffer size. Depending on the specifications of a particular implementation, it may be desirable to write the received data to the buffer and/or retrieve predicted data from the buffer in units of 8-bit bytes, navigation message words or subframes, or blocks of a different size.

Figure 7A:
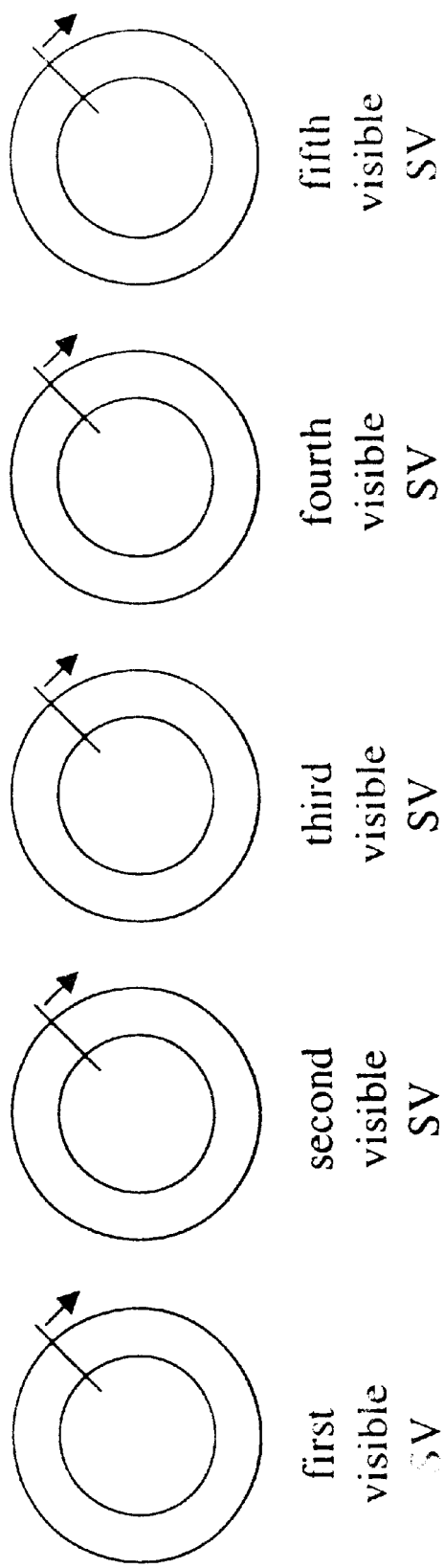
FIG. 7A illustrates a principle of operation of a set of prediction buffers.
Figure 7B:
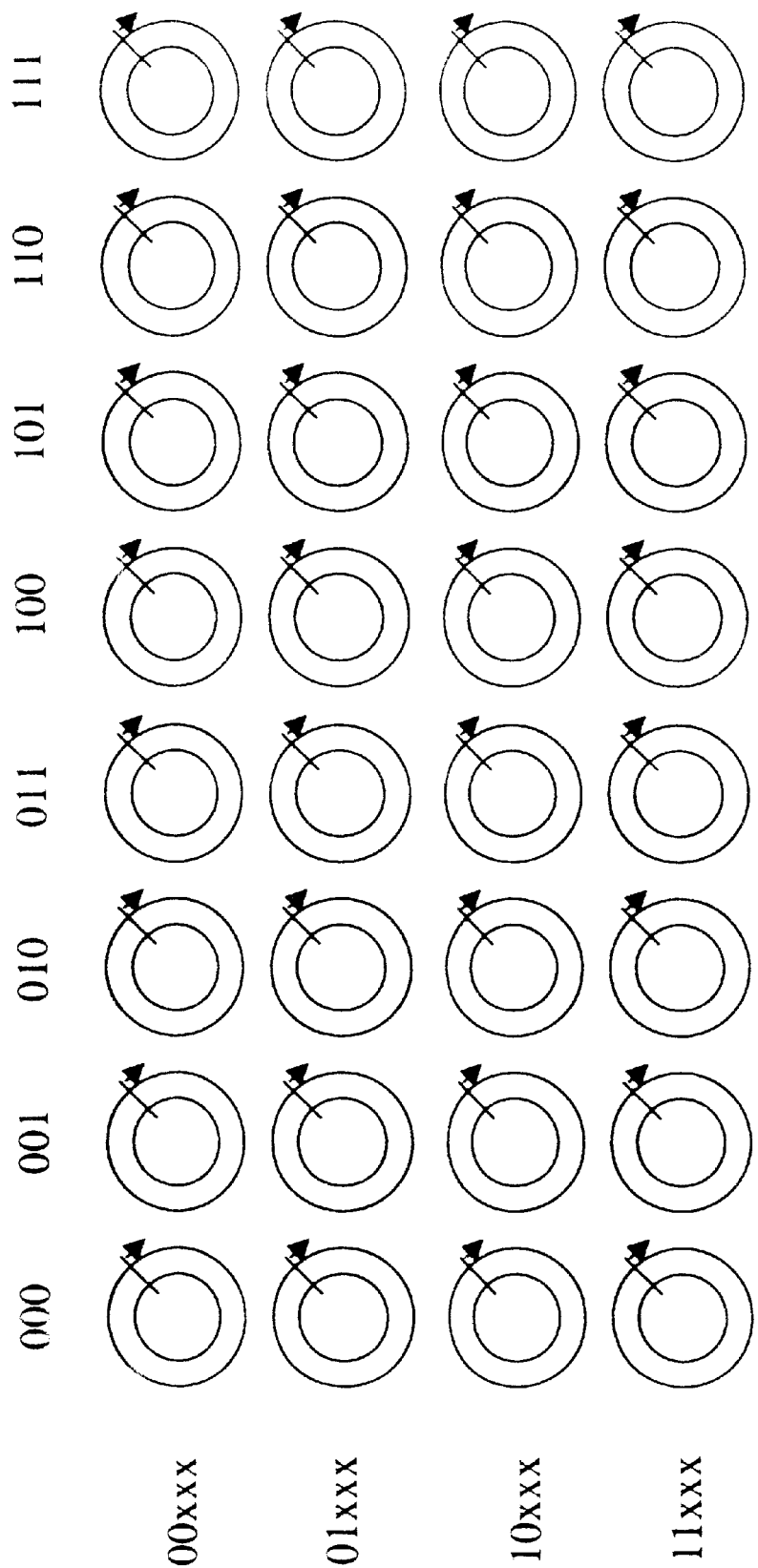
FIG. 7B illustrates a principle of operation of another set of prediction buffers.

As shown in FIG. 7A an array of buffers may be maintained for a limited number of SVs (e.g. only for a subset of the SVs that are currently visible). Alternatively, a prediction buffer comprising array of 32 individual buffers may be maintained as shown in FIG. 7B, with each individual buffer being dedicated to a particular one of the GPS SVs and indexed according to the SV identification (ID) number (expressed in FIG. 7B as a binary number from 00000 to 1111). In such an arrangement, any particular predicted data subframe in the buffer array may be identified by specifying the ID number of the transmitting SV to select the relevant buffer and a subframe index number (e.g. the desired TOW value mod 250, for a 25-subframe buffer as shown in FIG. 6) to select the subframe within the buffer.

FIG. 8A shows a block diagram of an apparatus 100 according to an embodiment of the invention. Predicting entity 10 receives data (e.g. as outputted by a receiver) and performs a method for data prediction as described herein. A prediction buffer (e.g. prediction buffer 20) includes a storage element that may be configured as described above with reference to FIGS. 6, 7A, and/or 7B. For example, a prediction buffer may comprise one or more semiconductor memory devices [e.g. dynamic or static random-access memory (RAM)], ferroelectric memory devices, and/or optical storage devices. Such a device may be fabricated as a dedicated chip or package, or such a device may be integrated into a chip or package that includes one or more other elements of the apparatus and/or of an appliance that incorporates such an apparatus. In one implementation, the prediction buffer is coupled to a predicting entity via one or more buses that may carry control, data, and/or address signals.

A prediction buffer may have a dual-port or other mechanism to allow simultaneous storage and retrieval of data. A storage element of a prediction buffer may also store other data of the apparatus and/or of an appliance that incorporates such an apparatus. In such a case, the prediction buffer need not reside in a fixed part of a storage element, and an area of the storage element may be used at one time to store prediction data and at another time to store other data. In some implementations, a storage element of a prediction buffer may be accessible by devices other than the predicting entity.

A predicting entity (e.g. predicting entity 10) may include a processing unit having one or more microprocessors, digital signal processors, and/or other arrays of logic elements. Such an array may be fabricated as a dedicated chip or package, or such an array may be integrated into a chip or package that includes one or more other elements of the apparatus and/or of an appliance that incorporates such an apparatus. For example, a predicting entity may include an embedded processor and/or a processor core fabricated into an application-specific integrated circuit (ASIC).

A predicting entity performs a method as described herein (and possibly other functions) by executing instructions (in sequence and/or in parallel) according to one or more programs or routines that may be hard-wired or stored in read-only memory (ROM), programmable ROM (PROM) such as erasable or electrically erasable PROM (EPROM or EEPROM, respectively), RAM, or nonvolatile RAM (NVRAM) such as flash memory. In some implementations, at least a part of the instructions and/or associated values (such as variables accessed during execution) may be stored in a storage element of the prediction buffer. Alternatively, a predicting entity may receive all or part of its instructions from one or more other devices or appliances (e.g. over a network connection that may be wired and/or wireless). A predicting entity may also execute instructions relating to other functions of the apparatus and/or of an appliance that incorporates such an apparatus. Instead of or addition to such instructions, a predicting entity may also perform a method as described herein in response to signals (e.g. interrupt requests) received from other devices within or outside of the apparatus and/or from other programs or routines executing on the processing unit.

FIG. 8B shows a block diagram of an apparatus 110 according to an alternate embodiment of the invention that includes a signal receiver 30 that receives a transmitted signal and outputs data to predicting entity 12, which calculates and stores predicted data to prediction buffer 21. FIG. 8C shows a block diagram of an implementation 110a of apparatus 110 that includes a GPS receiver 32. Receiver 32 receives a signal transmitted by a SV and outputs GPS navigation data to predicting entity 14, which calculates and stores predicted data to prediction buffer 22 as described herein.

In one implementation, each individual prediction buffer comprises four-byte (i.e. 32-bit) cells containing predicted data and additional information. For example, each cell may have a valid flag, which is set to show that the cell contains a valid prediction. At the start of operation, all valid flags are reset. After a SV comes into view, received data becomes available and the valid bits are set as predictions are stored. Thereafter, valid flags may be reset in accordance with events that may affect prediction reliability, or no resetting may be performed. In another implementation, a valid flag of more than one bit may be used to indicate differing degrees of reliability.

Each 32-bit cell may contain a 30-bit navigation word and a one-bit valid flag. Alternatively, the ten navigation words may be stored as a 300-bit subframe with one or more valid flags. Alternatively, the data of each navigation word may be stored as 24 data bits (i.e. without checksum calculation and/or without parity covering), or the data of each ten-word subframe may be stored as 240 bits or 30 bytes. The storage length of a predicted subframe may be further reduced by omitting other redundant information such as the parity control bits and/or other bits of the data message that may easily be regenerated. In the latter cases, checksum calculation, parity covering, and/or calculation of other redundant information may be performed at some point while or after the data is retrieved from the buffer (for example, in response to a prediction request as described below).

Although the method of FIG. 5 has little processing overhead, portions of the received data may change from one superframe to the next. For example, at least some portions of a GPS navigation data message will change from one superframe to the next. Because of the checksum and parity covering operations, a change to only one bit may corrupt a significant portion of the remainder of a GPS subframe.

One portion of a GPS message that changes at every subframe is the timestamp that appears as the first 17 bits of the HOW (i.e. the TOW value). Reset at midnight Saturday–Sunday, the TOW value indicates the GPS time of the next subframe transition. Each unit in the TOW value indicates a period of six seconds (i.e. one GPS subframe), and the TOW value is incremented by exactly one unit from one subframe to the next. As a result of this incrementing, the timestamps (and therefore the HOWs) in GPS subframes as predicted by the method of FIG. 5 will be incorrect.

Because the last two bits of the HOW are defined to have values of zero, it may be desirable to suppress propagation of HOW errors into GPS subframes 3–10 by forcing these bits to zero (i.e. before referencing them in checksum or parity covering operations for the next subframe). The HOW may also be skipped or discarded during the prediction, or the interval for which prediction is requested may be adjusted (with appropriate notification to the requester) so that the predicted data retrieved from the prediction buffer does not include a HOW. Alternatively, a unit applying the predicted data may ignore the predicted HOW.

Figure 9A:
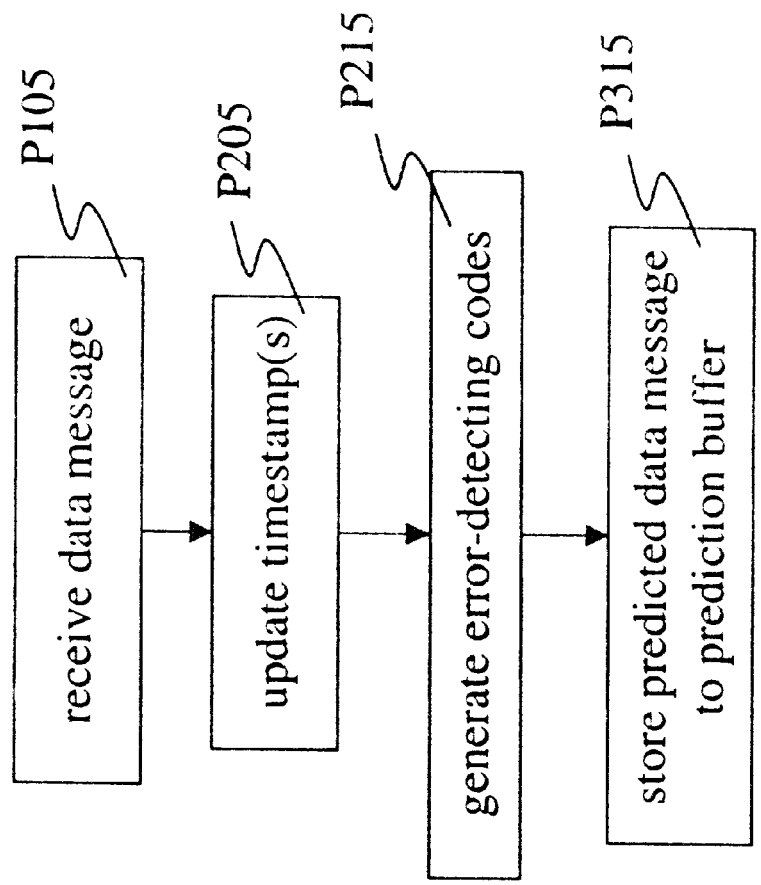
FIG. 9A is a flowchart of a method of predicting data according to a further embodiment of the invention.

In FIG. 9A, a method according to an alternate embodiment of the invention is presented. A data message is received in task P105, and task P205 updates one or more timestamps in the message. Task P215 generates new error-detecting codes that may reflect a change in the message as a result of the newtimestamps, and task P315 stores the predicted message to a prediction buffer.

Figure 9B:
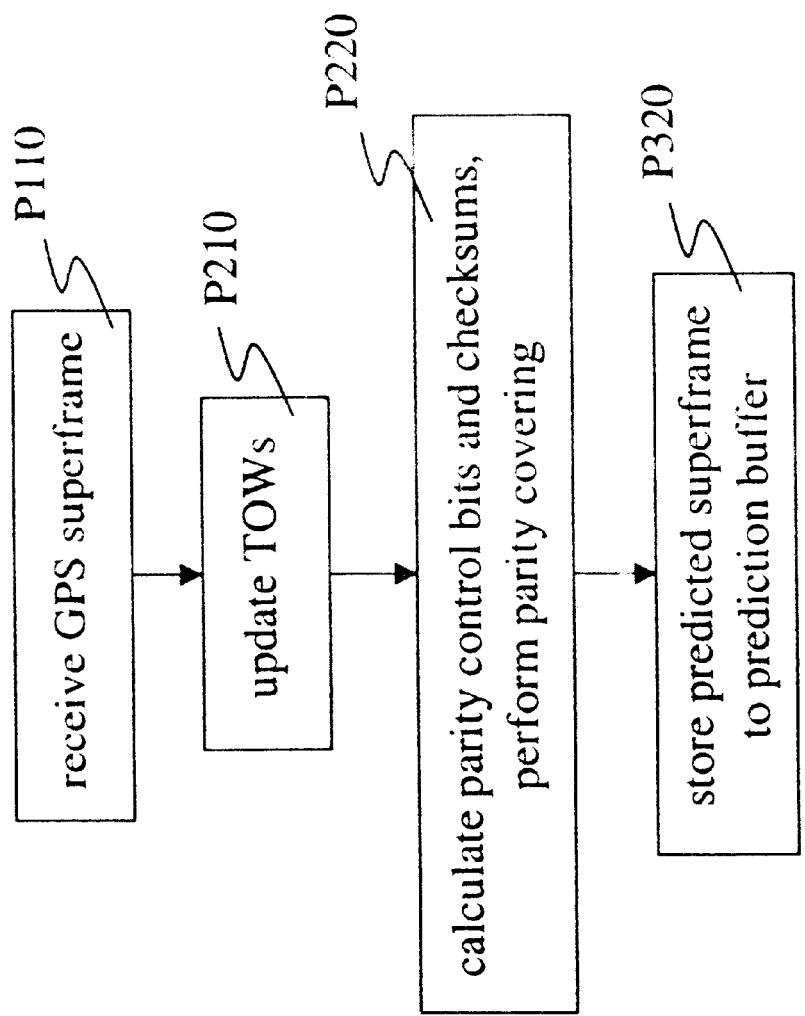
FIG. 9B is a flowchart of a method of predicting data according to a further embodiment of the invention.

FIG. 9B shows a flowchart for an implementation of a method as shown in FIG. 9A. In task P210, the TOW of each received subframe is incremented by 125. In task P220, the checksum for each words of each subframe is regenerated, the parity control bits 23 and 24 of words two and ten are calculated, and all bits are parity covered as described above. Alternatively, only the checksum of word 2 and the parity control bits 23 and 24 of word 2 may be regenerated. One or more among tasks P210, P220, and P320 may contemporaneously with task P110 such that at least a portion of the predicted data may be processed and/or available before the entire superframe has been received. In another implementation, tasks P210 and P220 may be performed after the received data is stored to the prediction buffer, with the appropriate valid bits being reset until these tasks are completed. Assuming perfect signal reception and no data updates, a completely accurate prediction may be expected.

In a method of predicting data according to a further embodiment of the invention, a fixed string (e.g. the GPS TLM word) is tested. The GPS TLM word includes a constant 8-bit preamble for synchronization and, in most cases, the TLM word is the same over all GPS subframes for a period of one week. Occasionally, however, a SV will transmit a subframe in which the regular TLM word is replaced by an irregular one (e.g. a TLM word that contains a classified system message). While the occurrence of an irregular TLM word is largely unpredictable, the appearance of irregular TLM words in consecutive subframes is highly unlikely. By storing a copy of the regular TLM word, and substituting this copy in the prediction for an irregular TLM word that was received, the number of TLM word prediction errors can be reduced by about 50%.

Figure 10:
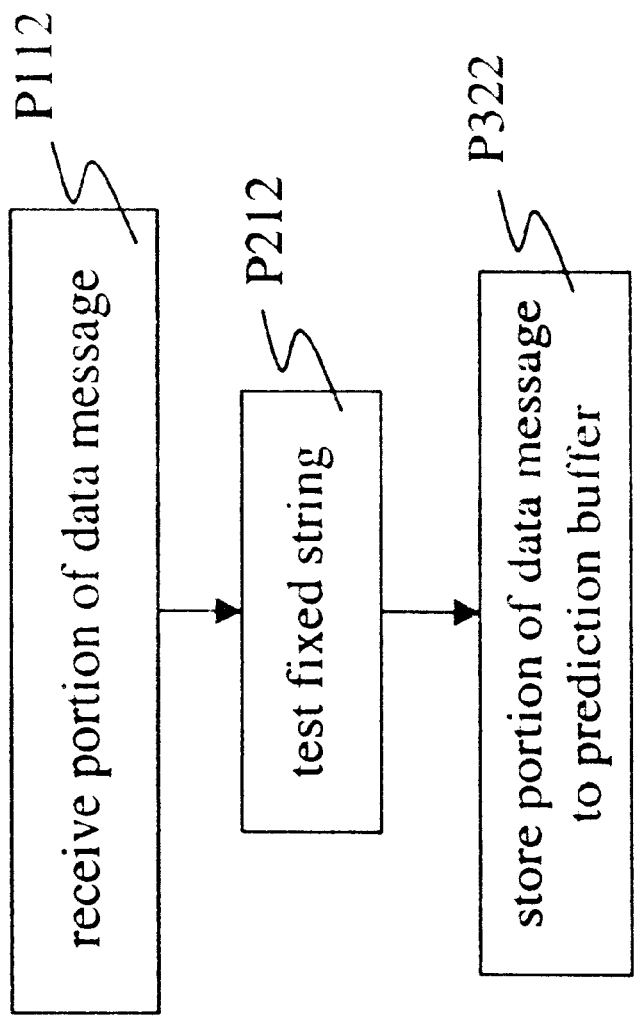
FIG. 10 is a flowchart of a method of predicting data according to a further embodiment of the invention.

FIG. 10 shows a flowchart for a particular implementation of a method as described above. In task P112, a portion of a data message (e.g. a GPS subframe) is received. In task P212, a fixed string of the portion is tested. The fixed string may be a TLM word in a GPS data message, or a synchronization and/or training sequence (e.g. for channel estimation) in another data message. The result of such a test may be used for correcting the string in the prediction or, alternatively, flagging the error (e.g. by issuing a warning signal or resetting the valid flag for the affected predicted data block). In task P322, the predicted data is stored to a prediction buffer (e.g. as indexed by the SV ID and TOW).

Figure 11:
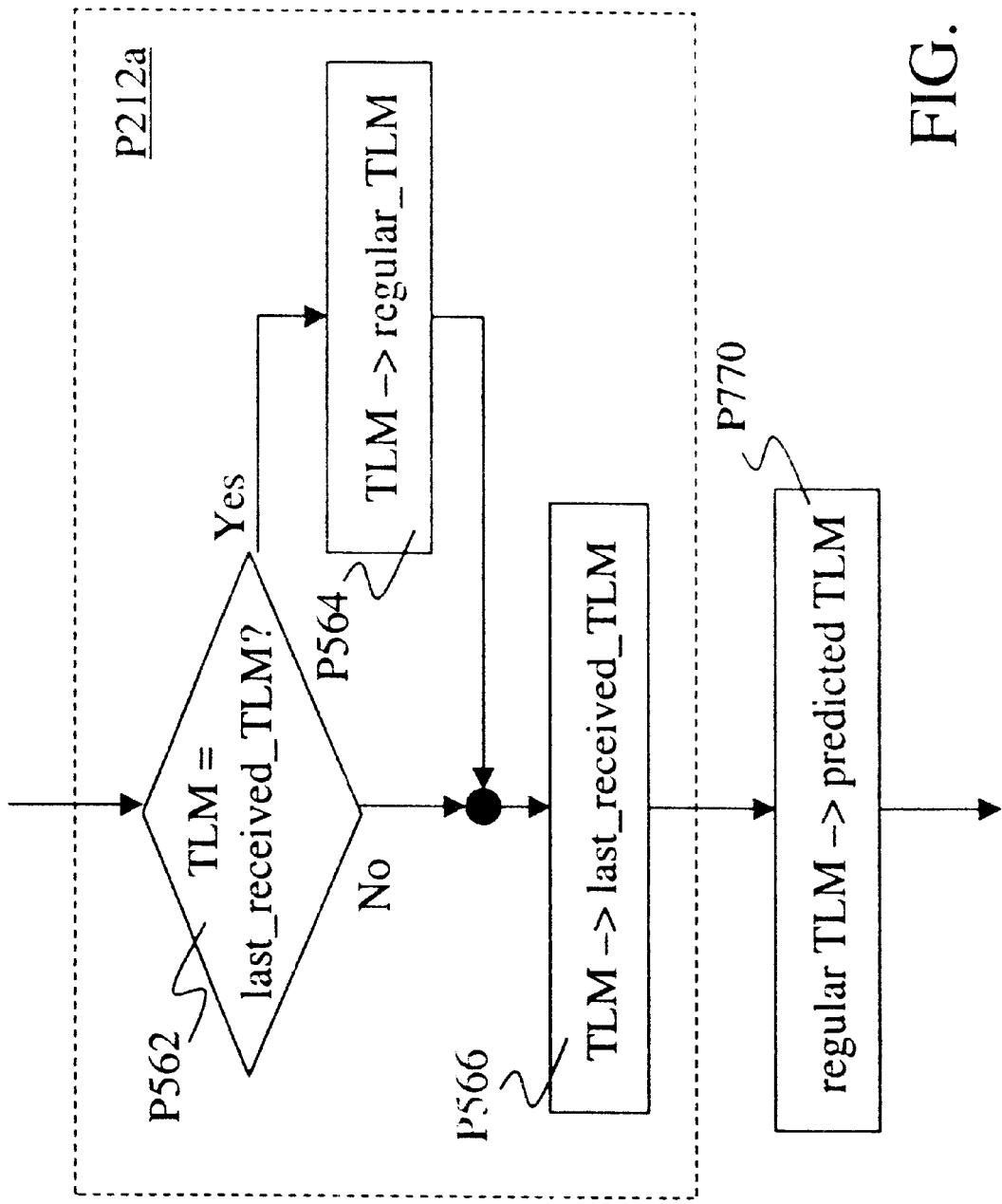
FIG. 11 is a flowchart showing an implementation of a task to test a TLM word and a task to correct a TLM word.

FIG. 11 shows one implementation P212a of task P212 that performs GPS TLM word testing, along with an implementation of a task P770 that performs TLM correction. In task P562, the received TLM word is checked to see if it is different from the last TLM word received. If the same TLM word has been received twice consecutively, then it is stored (e.g. to a microprocessor register or other memory location) as the regular TLM word in task P564. In task P5667 the received TLM is stored in memory as the last received TLM word. In task P770, the regular TLM is substituted for the received TLM in the predicted data.

In the message data of a GPS data message, two principal types of updates may occur. The first is an update to the ephemeris data, which occurs once every two hours and starts exactly at the GPS hour boundary. Ephemeris updates leave the almanac data unchanged, and because the complete ephemeris data set has a length of only 3 subframes, each two-hour period will include only 18 seconds during which the ephemeris prediction is likely to be erroneous. Even within this span of three subframes, limited prediction can still be performed because the first two words of each of the three missing GPS subframes can be predicted: the TLM word is most likely unchanged and the flag bits of the HOW are also unchanged, while the remainder of the HOW may be generated from past received data and the GPS time.

Figure 12:
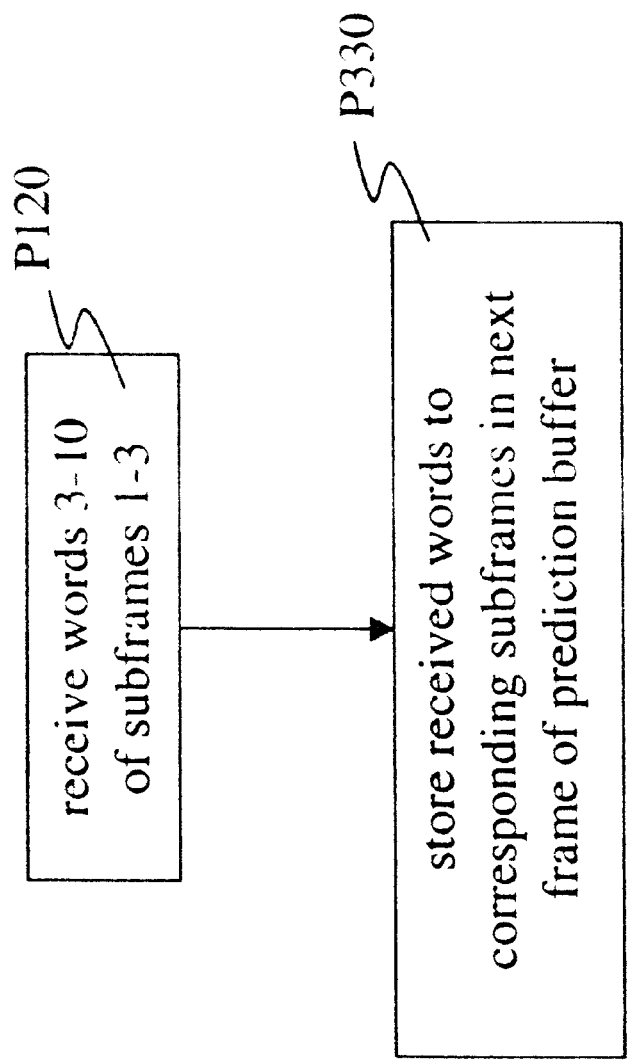
FIG. 12 is a flowchart of a method of predicting data according to a further embodiment of the invention.

In applying a method for predicting data that predicts the next superframe (e.g. as shown in FIG. 5), it may be necessary in some cases to wait for 12.5 minutes before the first prediction for a SV is available, (e.g. after a cold start or during a reacquisition of a SV), even though the ephemeris data set repeats. FIG. 12 shows a method according to a further embodiment of the invention in which predictions for much of a GPS data message may be available after only 30 seconds.

In task P120, words 3–10 of subframes 1–3 are received (any other data received may be processed or ignored). In task P330, the words 3–10 are stored to the prediction buffer as predictions of the corresponding words in the following frame. As noted above, the parity encoding and CRC operations on words 3–10 do not depend on the contents of words 1 and 2. The TLM word (word 1) may also be included in the prediction if desired, as it is expected to change only infrequently.

Figure 13A:
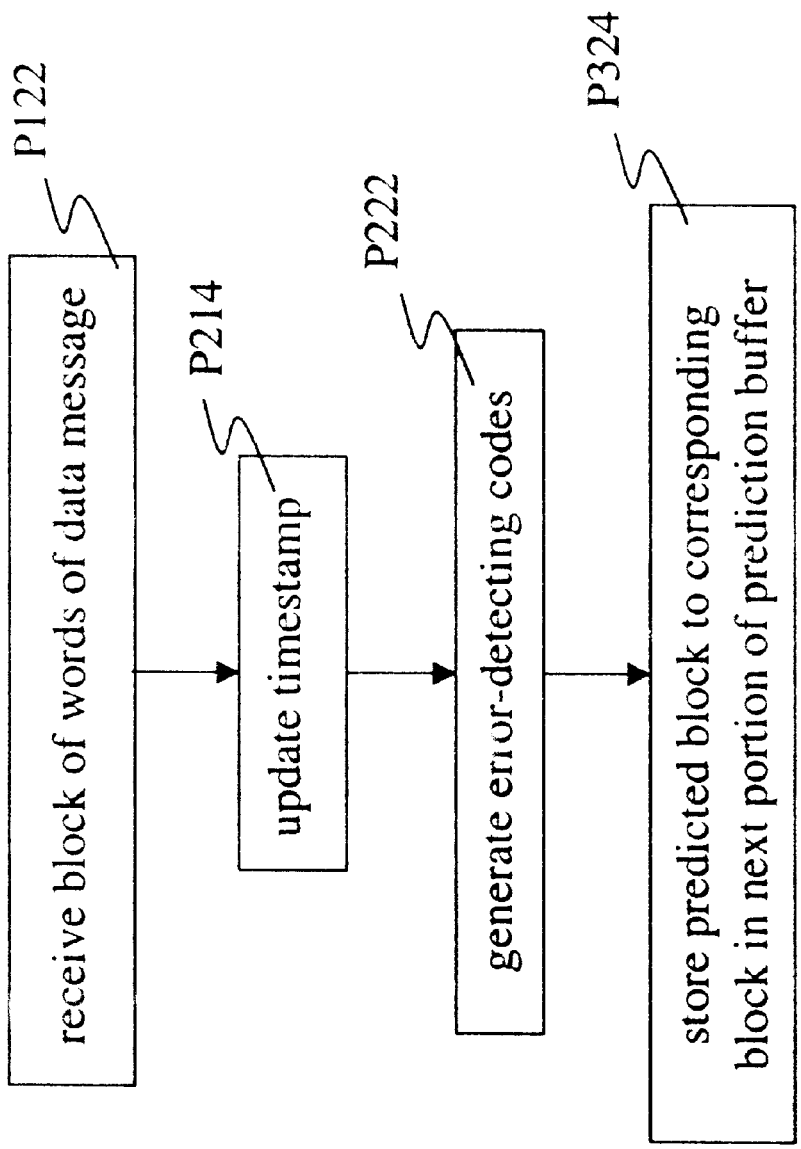
FIG. 13A is a flowchart of a method of predicting data according to a further embodiment of the invention.

FIG. 13A shows a method in which in task P122, a block of words of the data message is received. In task P214, the timestamp is updated. In task P222, the error-detecting codes are generated. And in task P324, the predicted block is stored to the corresponding block in the next portion of the prediction buffer.

Figure 13B:
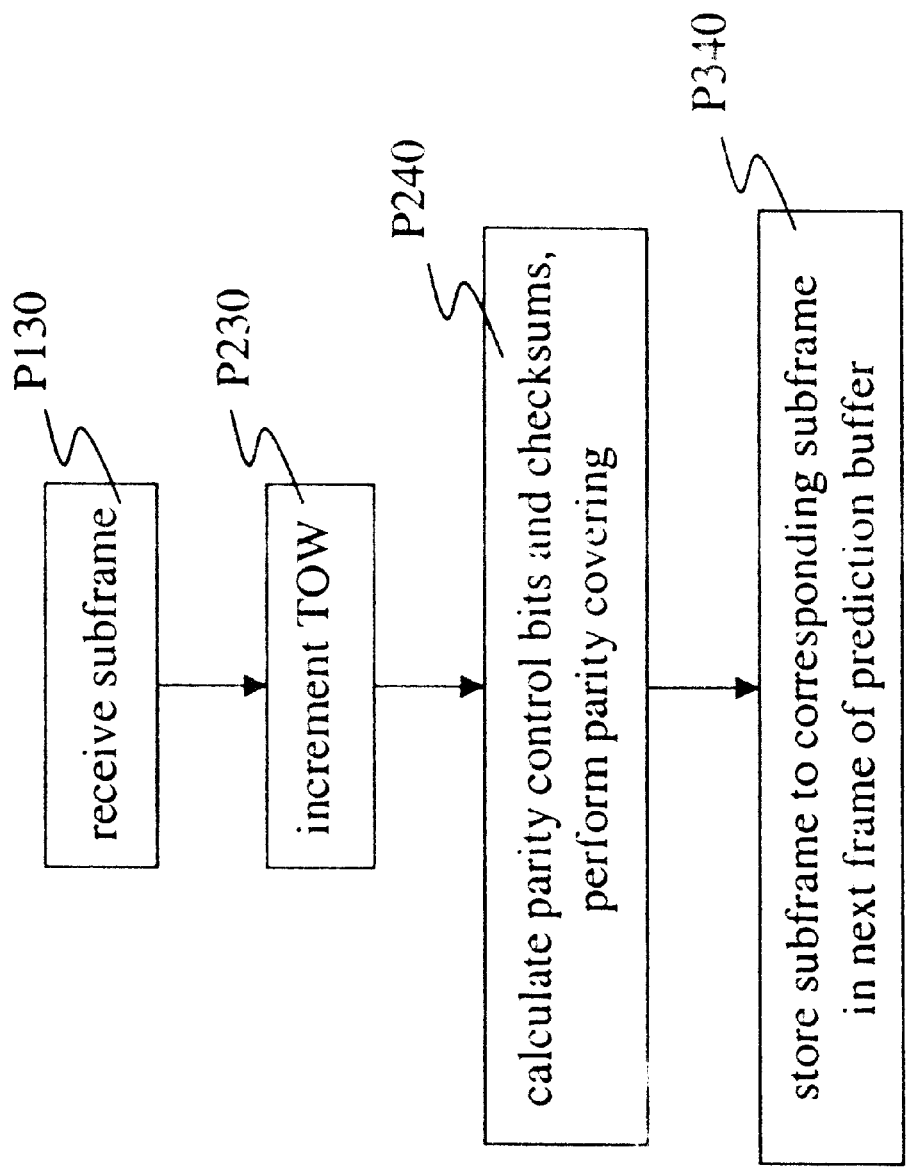
FIG. 13B is a flowchart of a method of predicting data according to a further embodiment of the invention.

FIG. 13B shows a method in which the techniques described above are applied to obtain predicted data for an entire subframe after only 30 seconds (subframes 1–3 only). In task P230, the TOW oft e subframe received in task P130 is updated to correspond to the next frame (i.e. its value is incremented by 5). In task P240, the parity check bits are recalculated based on the other bits of the predicted future data, the checksum is regenerated, and covering is performed as describe above with respect to task P220. In task P340, the predicted subframe is stored to the prediction buffer at a location corresponding to the same subframe of the following frame. Note that while this method is useful for providing predictions of subframes 1–3 after only 30 seconds, the almanac data of subframes 4 and 5 repeats only every superframe even in the absence of a update, and the information necessary to provide a prediction for the following frame may not generally be available.

Upon a cold start of a GPS receiver (for example, a handheld GPS receiver, or a GPS receiver which is installed in a vehicle or in a mobile unit such as a cellular telephone, or in the case of an acquisition of an ascending SV at low elevation or a reacquisition of a SV, a method as shown in FIG. 13B may be used to predict up to 60% of the bits of a GPS data message after only a 30-second lay. If an operation that applies the predicted data can be synchronized to be active only during subframes 1–3 of each received frame, then the prediction may be 100% efficient. In such a case, it is assumed that the receiver applying the predicted data is or may be synchronized to GPS time (within the initial 30 seconds of operation if necessary).

Figure 14:
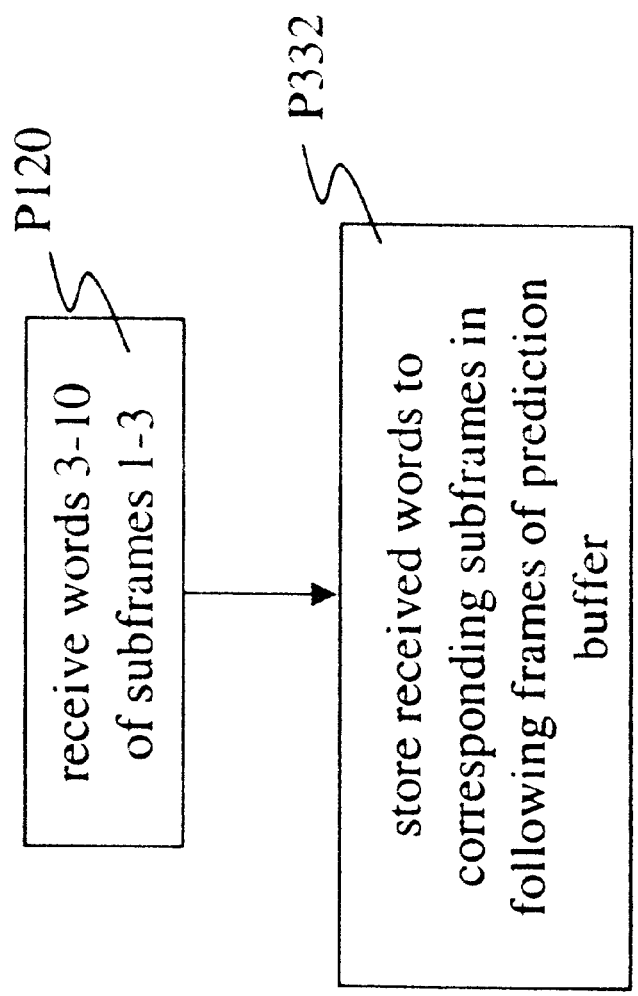
FIG. 14 is a flowchart of a method of predicting data according to a further embodiment of the invention.
Figure 15A:
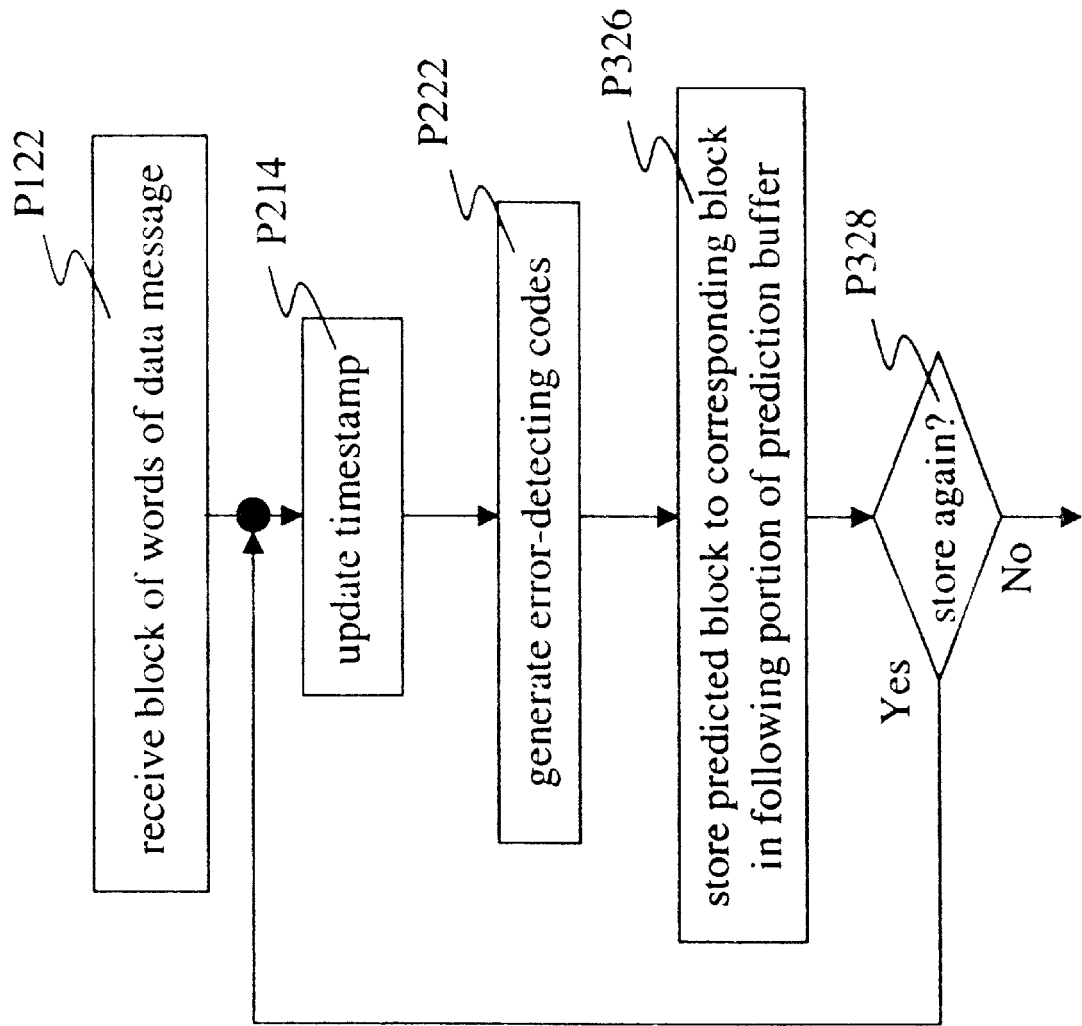
FIG. 15A is a flowchart of a method of predicting data according to a further embodiment of the invention.

FIGS. 14 and 15A and B show versions of the methods of FIGS. 12 and 13A and B that are modified to allow duplicate prediction. In these embodiments, the ephemeris data is copied not only to the next frame in the prediction buffer but to one or more other frames as well. Under normal operation, such operation might be redundant. In case of an interruption in or a corruption of the received data signal (which may be indicated by a checksum failure, and which may be caused by, e.g., a satellite dropout occurring at low elevation angles), however, duplicate prediction can help to reduce or avoid the effect of the data loss. In a distributed implementation of a method according to an embodiment of the invention, predicted data may be forwarded to other predictors (e.g. across a local-area network) to alleviate the effects of localized SV invisibilities.

FIG. 14 shows in P120, words 3–10 of subframes 1–3 are received. In task P332, the received words are store to the corresponding subframes in the following frames of the prediction buffer.

In FIG. 15A, task P122 shows that a block of words of the data message is received. In P214, the timestamp a updated. In P222, error-detecting codes are generated. In P326. the predicted block is stored to a corresponding block in a following portion of the prediction buffer. In P328, a decision is made to store again, If the decision is yes, the process is returned to between tasks P122 and P214. If the decision is no, the process of FIG. 15A exits.

Figure 15B:
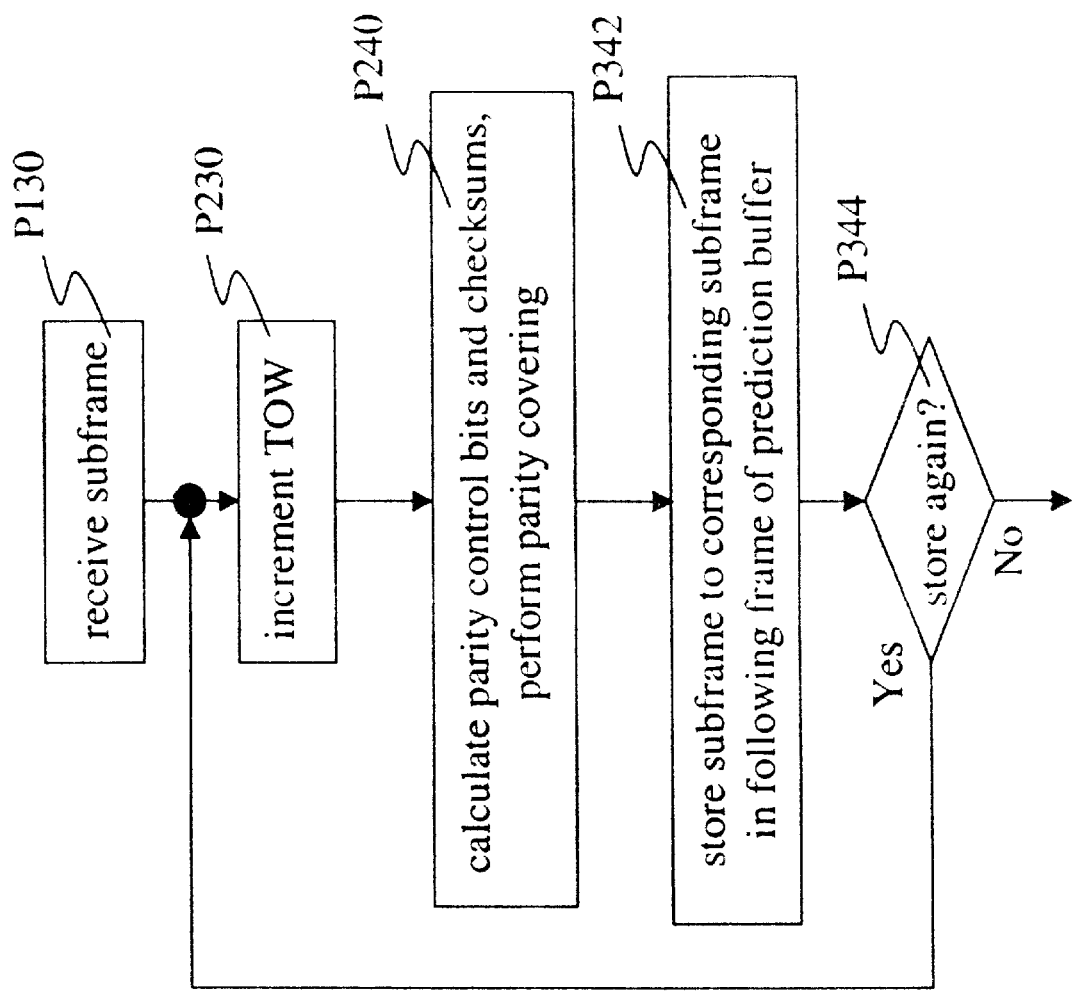
FIG. 15B is a flowchart of a method of predicting data according to a further embodiment of the invention.

In FIG. 15B, task P130 receiving a subframe. In P230, the TOW is updated. In P240, parity control bits and checksums are calculated and parity covering is performed. In P342, the subframe is stored to a corresponding subframe in a following portion of the prediction buffer. In P344, a decision is made to store again, if the decision is yes, the process is returned to between tasks P130 and P230. If e decision is no, the process of FIG. 15B exits.

An update to the almanac table, which occurs when new almanac data is uploaded to the SV, is the other principal type of update in a GPS system. The GPS almanac table is divided into 50 sections, sections 1–32 corresponding to individual SVs, and sections 33–37 being reserved for other devices such as additional transmitters deployed at airports. Such other devices have assigned Gold codes and may appear to a GPS receiver as just another SV.

Although the exact timing and frequency of the almanac updates is unpredictable, each update takes 12.5 minutes (or one superframe) to complete, and an update is most likely to occur once every 20–40 hours. It has been observed that when a satellite updates an almanac page, it will also update all pages that are to be transmitted by the other satellites. In a method according to a further embodiment of the invention, a copy of the most recent almanac data set is maintained and used to overwrite the almanac portions of the prediction buffer for a SV when an update is detected at that SV. Such an operation may reduce the number of almanac prediction errors by a factor of N, where N is the number of operational satellites.

Within every frame, the first three subframes can be validly predicted, except for the ones in the first frame because, again, the same ephemeris data is used. Thus, out of the 12.5 minutes=750 seconds, 30+(24×12)=318 seconds are lost. By using the almanac update method described earlier, this outage can be reduced by a factor of 5.

In accordance with one embodiment of the invention, the almanac table is corrected. As explained above, the almanac data set is the same for all satellites. Unfortunately, although subframe boundaries occur at the same moment at all GPS SVs, the almanac updates are not synchronized between satellites, so that any two SVs may each be transmitting a different version of the same almanac subframe at any given time. Furthermore, in any given frame for any given satellite, it is possible that there is a mix of old and new almanac pages.

In accordance with another embodiment of the invention, old almanac data is used in the predictions. That is, for satellites that have just risen over the horizon, the old almanac data as it was last seen can be used because there is a good chance that those satellites did not get uploads during the 6–7 hours while they were at negative elevation angles. If a change in the almanac bits is observed, then there was indeed an update, and in this case, all almanac predictions for the given satellites must be replaced with the known most recent almanac data. The basic mechanism to use old data is to adjust the TOW or timestamp upon transmission. If the TOW of the predicted subframe matches the current, then a valid prediction can be transmitted. If there is a mismatch, then that means the data is old, which can still be used as prediction, but the TOW and subsequently the CRC have to be updated.

Figure 16A:
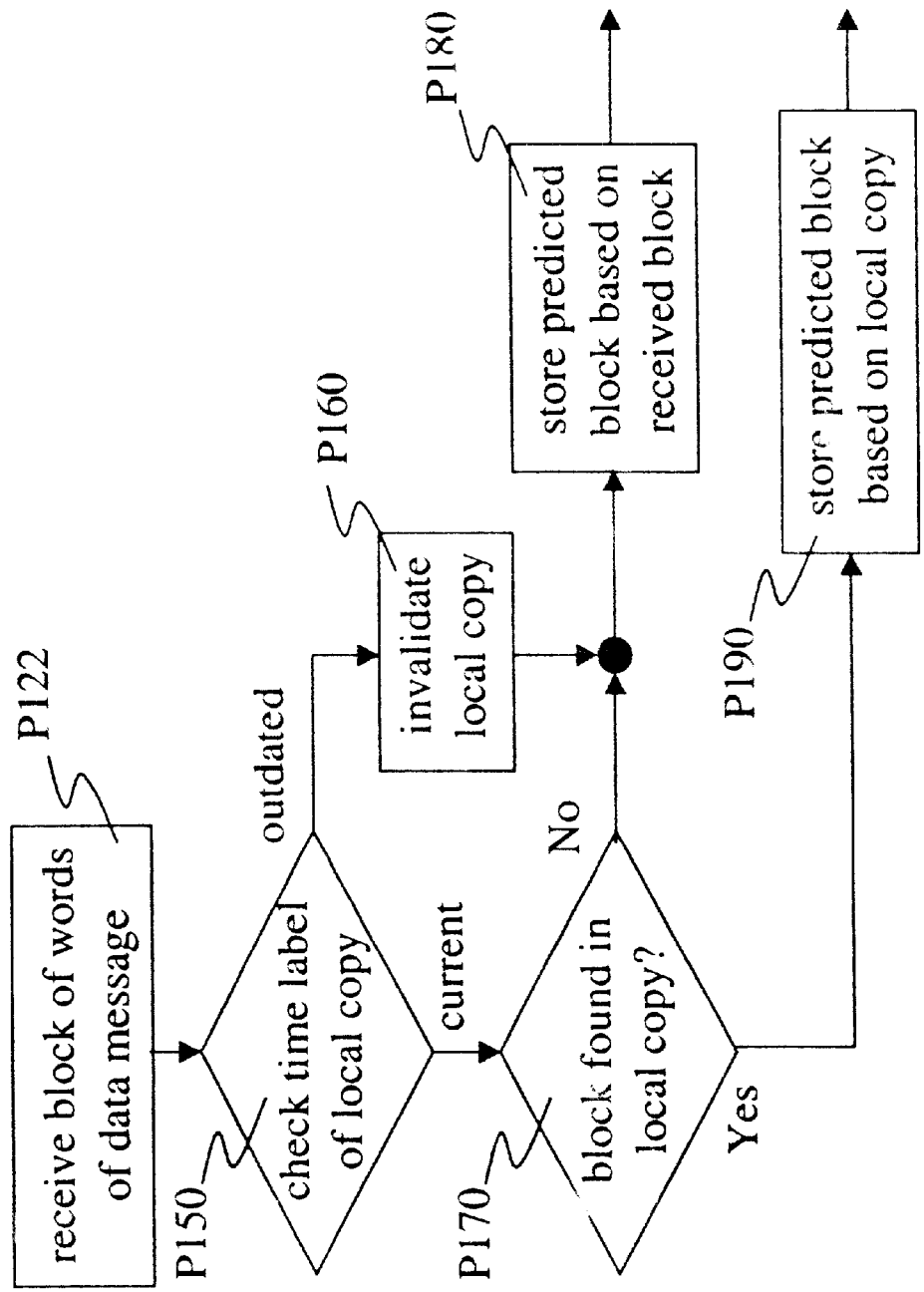
FIG. 16A is a flowchart of a method of predicting data according to a further embodiment of the invention.

In FIG. 16A, task P122 shows receiving blocks of words of the data message. In P150, the time label of the local copy is chocked. If it is outdated, task P160 is performed to invalidate the local copy in P160 an the process continues from block 180. If it is current, a determination is made in P170 whether or a block is found in the local copy. If a block is not found, the process continues from block P180. In block P180, a predicted block is stored based on the received block. If a block is found in the local copy in P170, a predicted block is stored based on the local copy in P190.

Figure 16B:
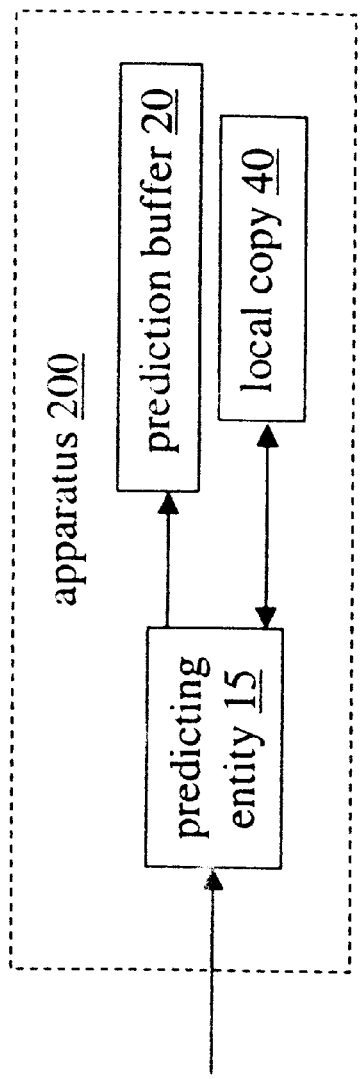
FIGS. 16B and 16C show block diagrams of apparatus according to embodiments of the invention.

In FIG. 16B, an apparatus 200 includes a predicting entity 15, which delivers an output to a prediction buffer 20. The predicting entity 15 also communicates with a local copy 40.

Figure 16C:
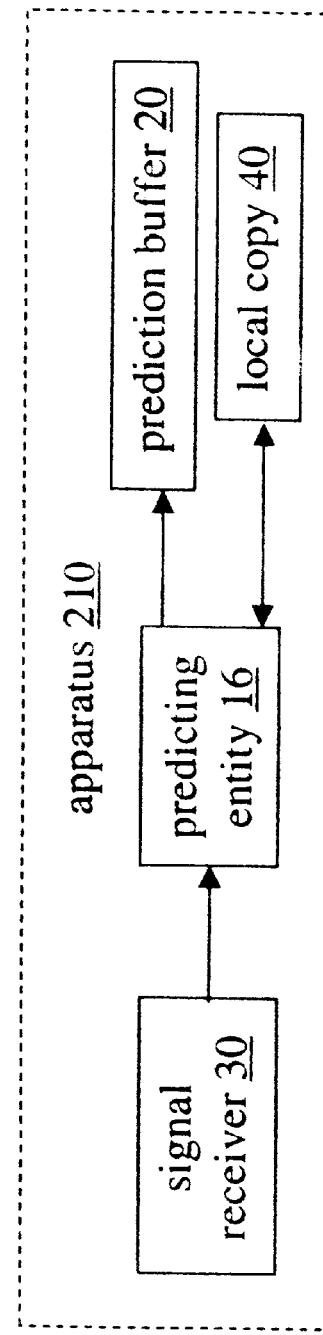

In FIG. 16C, an apparatus 210 includes a signal receiver 30 that delivers an output to a predicting entity 16, the predicting entity 16 delivers an output to a prediction buffer 20. The predicting entity 16 also communicates with a local copy 40.

Figure 16D:
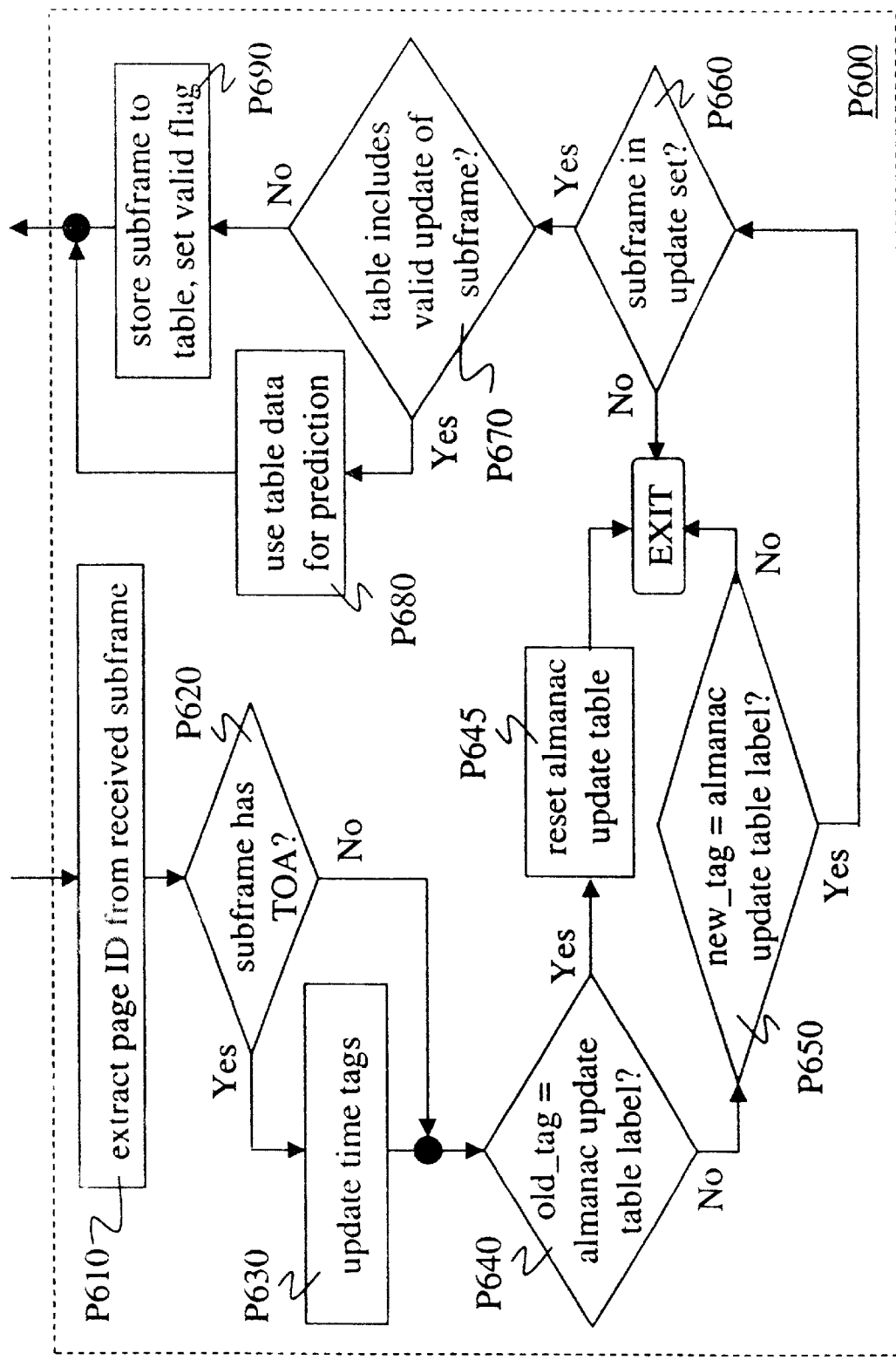
FIG. 16D is a flowchart of a method of predicting data according to a further embodiment of the invention.

In FIG. 16D, a process P600 includes a task P610 in which a page ID from a received subframe is extracted, and the process moves to P640. In P620, a determination is made whether the subframe has a TOA. Yes, the time tags are updated in P630. If No, the process moves to P640. In P640, a determination is made whether the old_tag equals an almanac update table label. If yes, the almanac update table is updated in P645 and the process exits. If no, a determination is made whether a new_tag is equal to an almanac update table label in P650. If No, the process exits. If Yes, a determination is made in P660 whether the subframe is in an update set. If No, the process exit. If Yes, a determination is made in P670 whether the table includes a valid update of the subframe. If Yes, the table data is used for prediction in P680. If No, the subframe is stored to the table and a valid flag is set.

In FIG. 16E, an apparatus 220 includes a predicting entity 17, which delivers an output to a prediction buffer 22, predicting entity also communicates with an almanac update table 50.

In FIG. 16F, an apparatus 230 includes a GPS receiver 32 which delivers an output to a predicting entity 18. The predicting entity 18 delivers an output to a prediction buffer 22. The predicting entity 18 also communicates with an almanac update table 50.

the GPS week boundary (midnight Saturday–Sunday), the frame and subframe numbers are reset. In a method according to a further embodiment of the invention, changes in the week change correction. In this embodiment, when the TOW approaches its maximum value, we know that a week change follows. That is, when the predicted TOW indicates a week change, the TOW value is corrected and the week number in word 3 of subframe 1 is incremented. Since at the week boundary both the frame and subframe numbers are reset, the index in the prediction buffer is adjusted accordingly. It should be noted that while the total number of subframes in a week (100,800) is an integer multiple of 5, it is not an integer multiple of 125. Thus, at week boundaries, there will be a jump in the frame index sequence.

The operation of the bit prediction algorithm is explained in the flowcharts shown in FIGS. 17–24 First, a current subframe from a GPS signal is received in step P510, and BPSK ambiguity are resolved in P520. The received subframe is stored in a working buffer in step P530. Thereafter, a next corresponding subframe is predicted using the methods described below in step 320 P700. The predicted subframe is saved and the process ends. Flowcharts P52a and P540a illustrate the process to determine whether a subframe prediction is feasible. This, takes a few milliseconds. If subframe prediction is not possible, the user has to wait for the next subframe, which takes 6 seconds.

Figure 17:
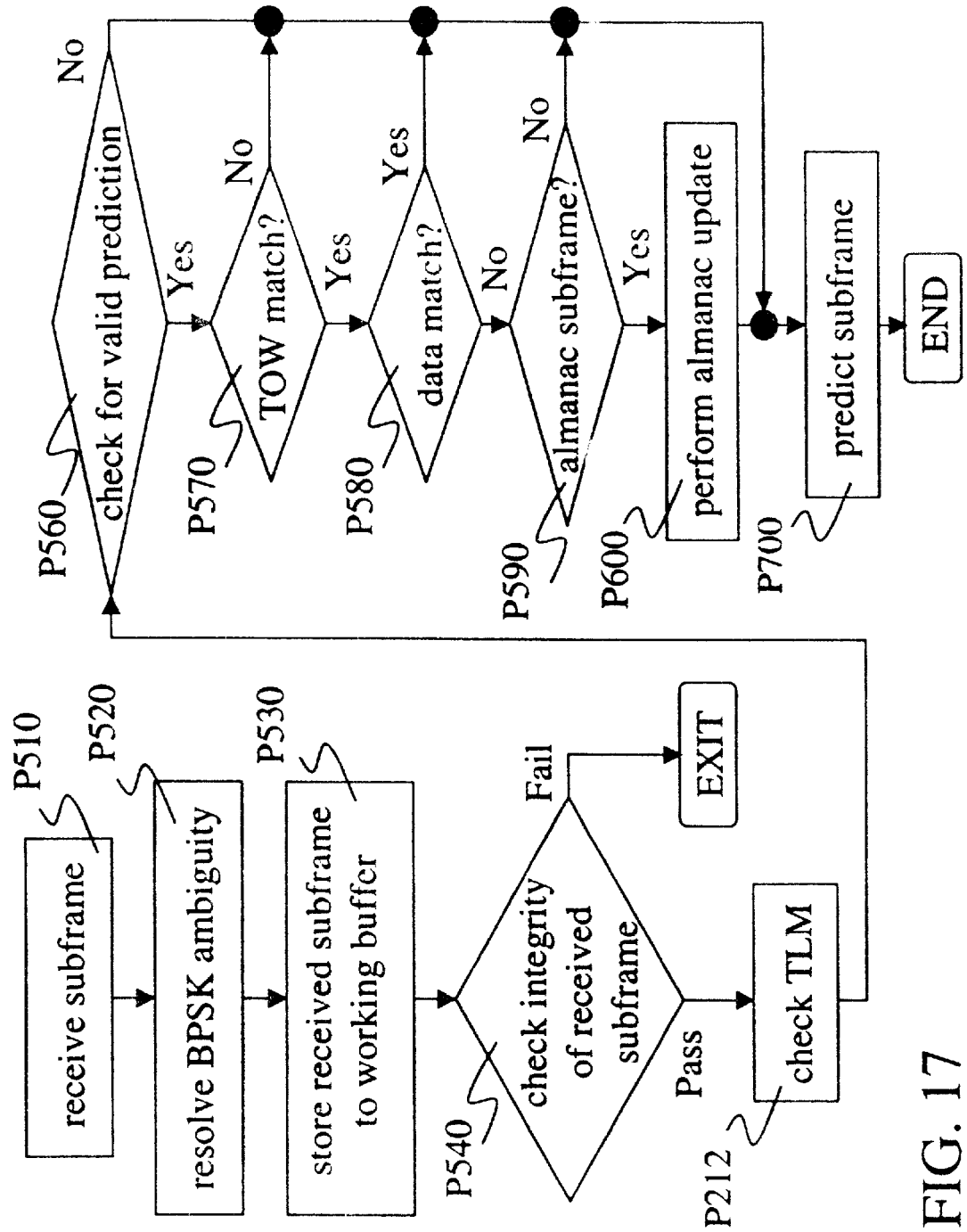
FIG. 17 is a flowchart of a method of predicting data according to a farther embodiment of the invention.
Figure 18:
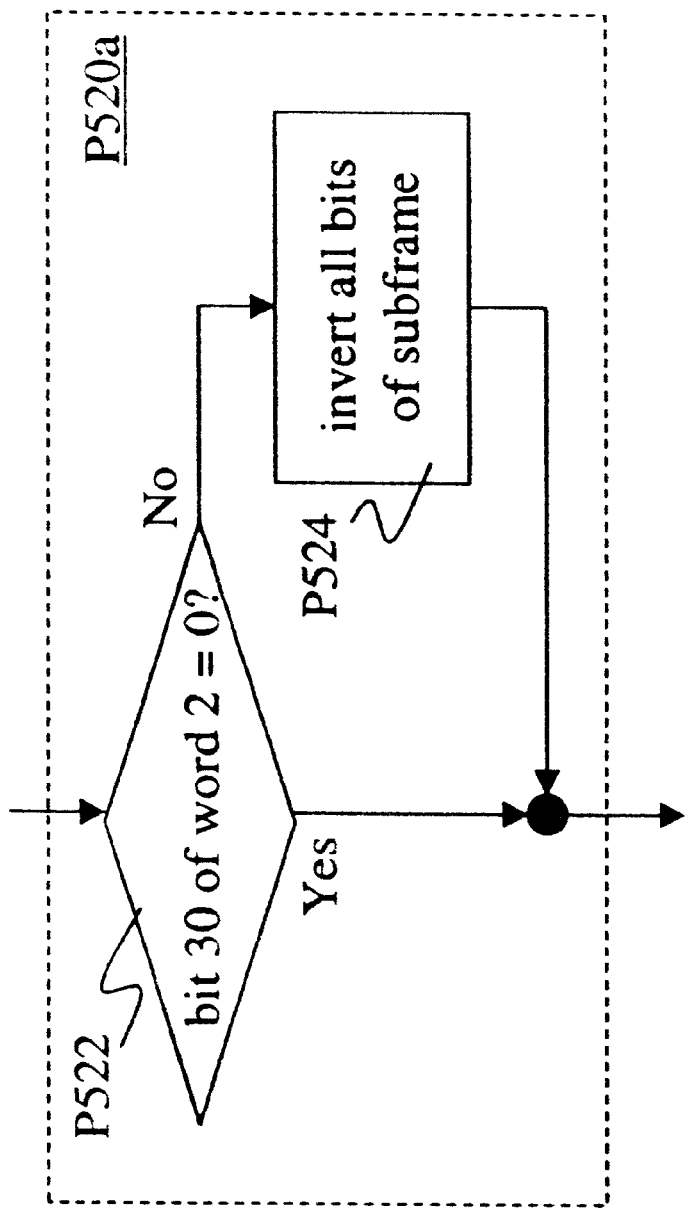
FIG. 18 is a flowchart of an implementation of a task to resolve phase ambiguity.

In the process, first, a subframe from an SV is received in task P510 Next, BPSK ambiguity is resolved, task P520. Details of the task are shown in task P520a in FIG. 18. The process determines whether bit 30 of word 2 is zero in step P522. If the bit 30 of word 2 is zero, then the subframe is stored in a buffer in step P530 (FIG. 17). If the bit 30 of word 2 is not zero, then all the bits in the received subframe are inverted in step P524 and stored in the buffer in step P530.

Figure 19:
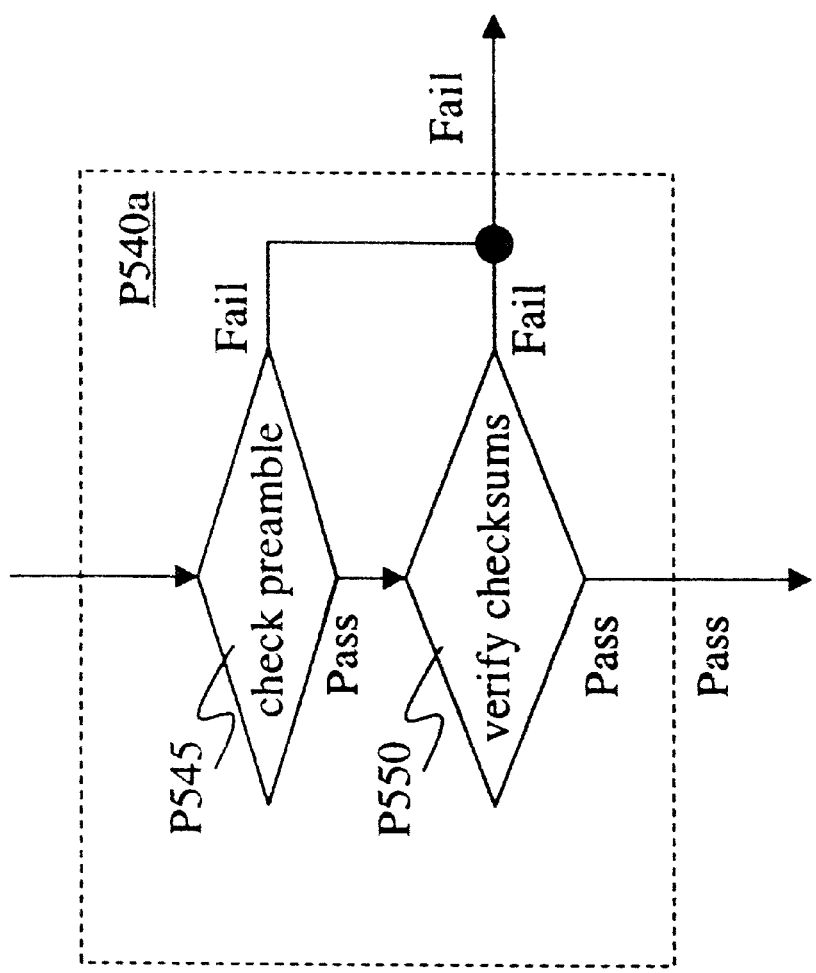
FIG. 19 is a flowchart of an implementation of a task to check integrity of a received subframe.

After storing the received subframe in the buffer in step P530, the checks process the integrity of the subframe in task P540. With reference to process P540a of FIG. 19, a determination is made whether the subframe header is valid. Process P40a in FIG. 19 shows a preamble check in P545. If the preamble cheek fails, the "Fail" path is followed. If the preamble check passes, the "Pass" path is followed and the checksums are verified P550. If the checksums fail, the "Fail" at is followed. If the checksums pass, the "Pass" path is followed. Thus, if the subframe header is not valid, then the process will exit and wait for the next subframe, which takes 6 second. If the subframe header is valid, then the process checks to the TLM, task P212.

Next, the process determines whether there is a valid prediction for this subframe in step P560. If there is no valid prediction for this subframe, then the process will perform subframe prediction in step P700. If there is a valid prediction for the subframe, then the process will determine whether the received and predicted TOW match in step P570. If the received and predicted TOW do not match in step P570, then the process will form the subframe prediction in step P700. If the received and predicted TOW do march, then the process will go to the next step which is to determine whether there is a perfect match between the received and predicted subframes in step P580. If there is no perfect in match, then the process will determine the errorcode and log the error. If there is a perfect match between the received and the predicted subframes, then the process will perform the subframe prediction in step P700. After the errorcode is logged, the process determines whether the subframe is an almanac subframe in step P590. If is not, then the process will perform the subframe prediction in step P700. If the process determines that the subframe is an almanac subframe, then the process will perform the almanac update in step 436 P600. After the almanac update is done in step P600, the process will perform the subframe prediction in step P700.

Figure 20:
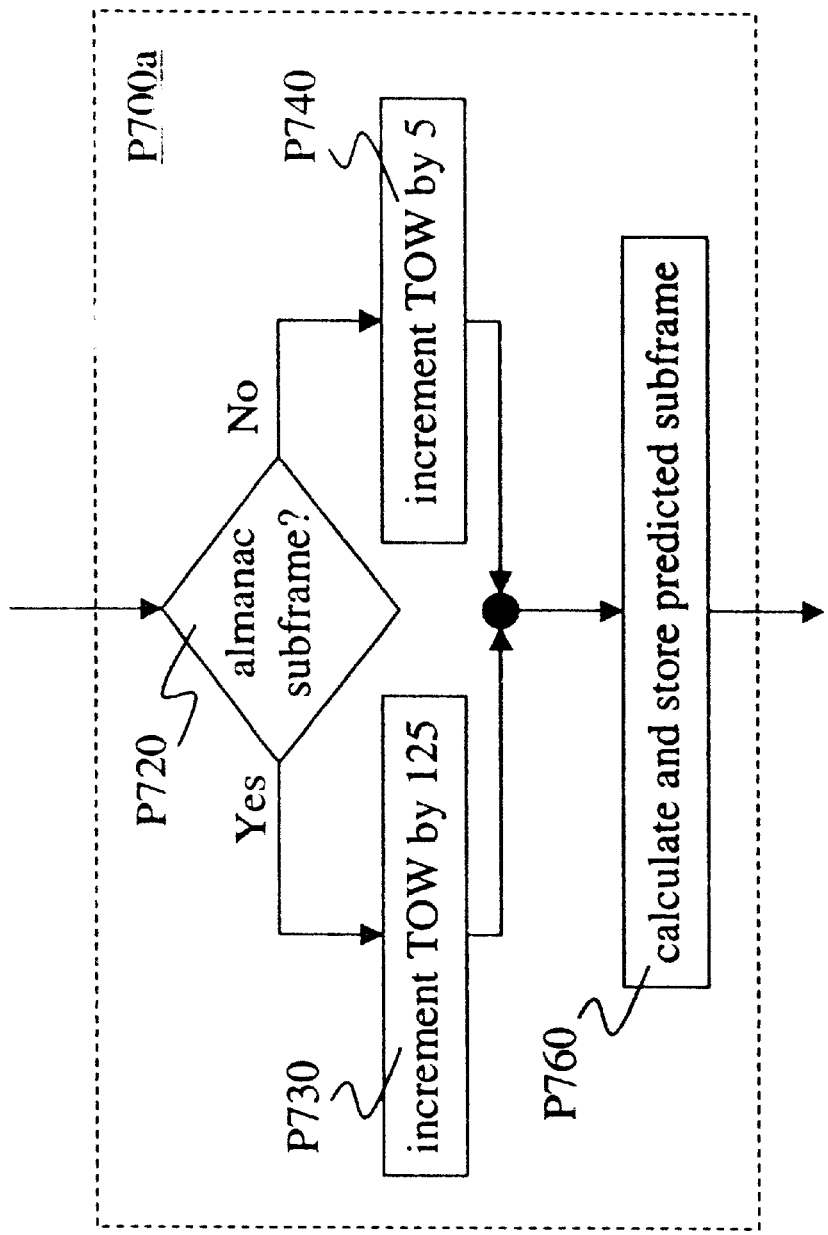
FIG. 20 is a flowchart of an implementation P700a of a task P700 to predict a subframe.

The task P570 as shown in FIG. 17 will now be described with reference flowchart P700a in FIG. 20. The value of the TOW as received is saved. Next, the process determines whether the subframe was an almanac subframe in task P720. If the receive subframe is an almanac subframe, then the loop increment value is set to 125 in task P730. If the received subframe is not an almanac subframe, then the loop increment value is set to 5 in task P740. Calculation and storage of the predicted subframe is performed in task P760.

Figure 21:
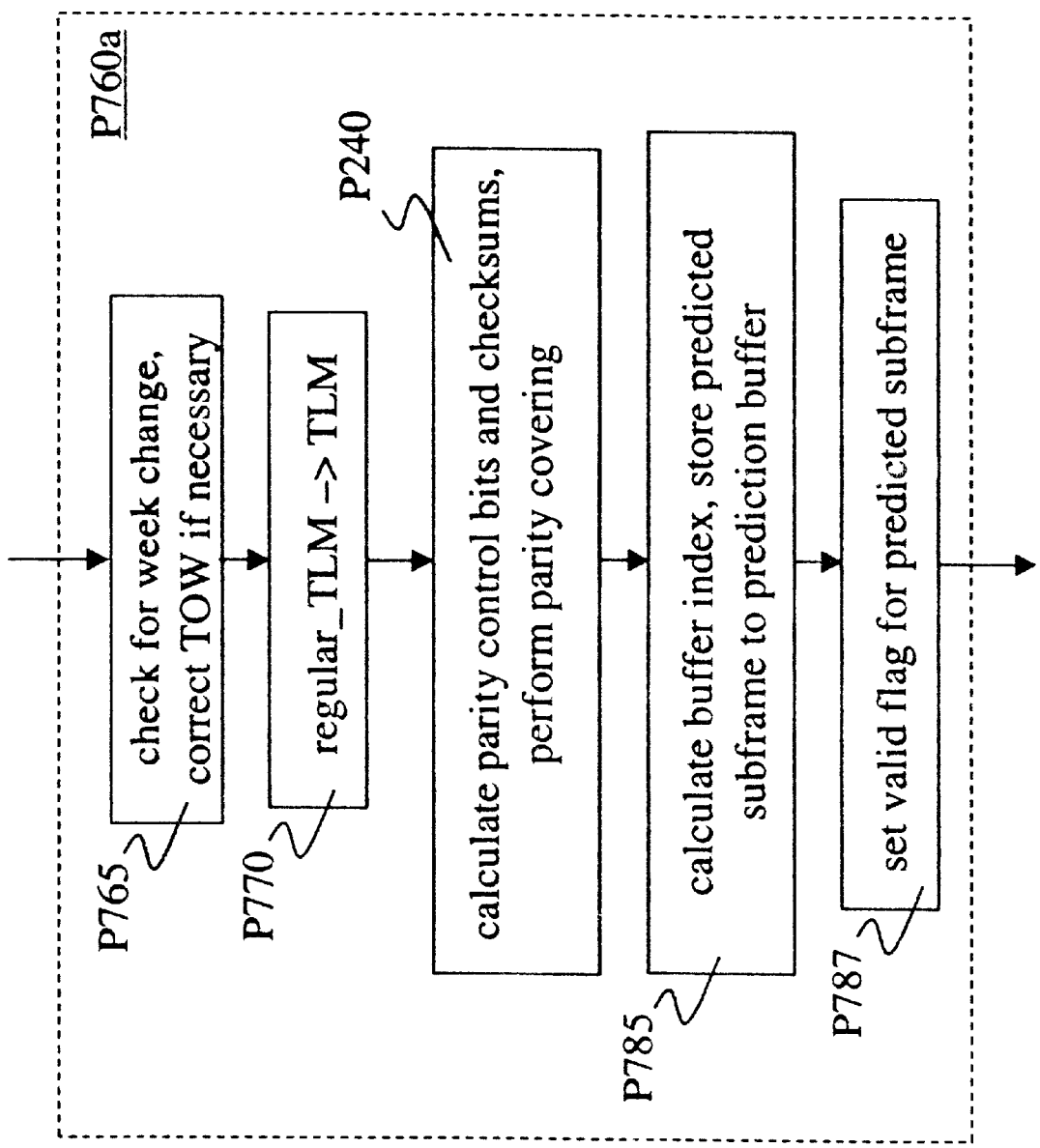
FIG. 21 is a flowchart of an implementation of a subtask to calculate and store a predicted subframe.
Figure 22:
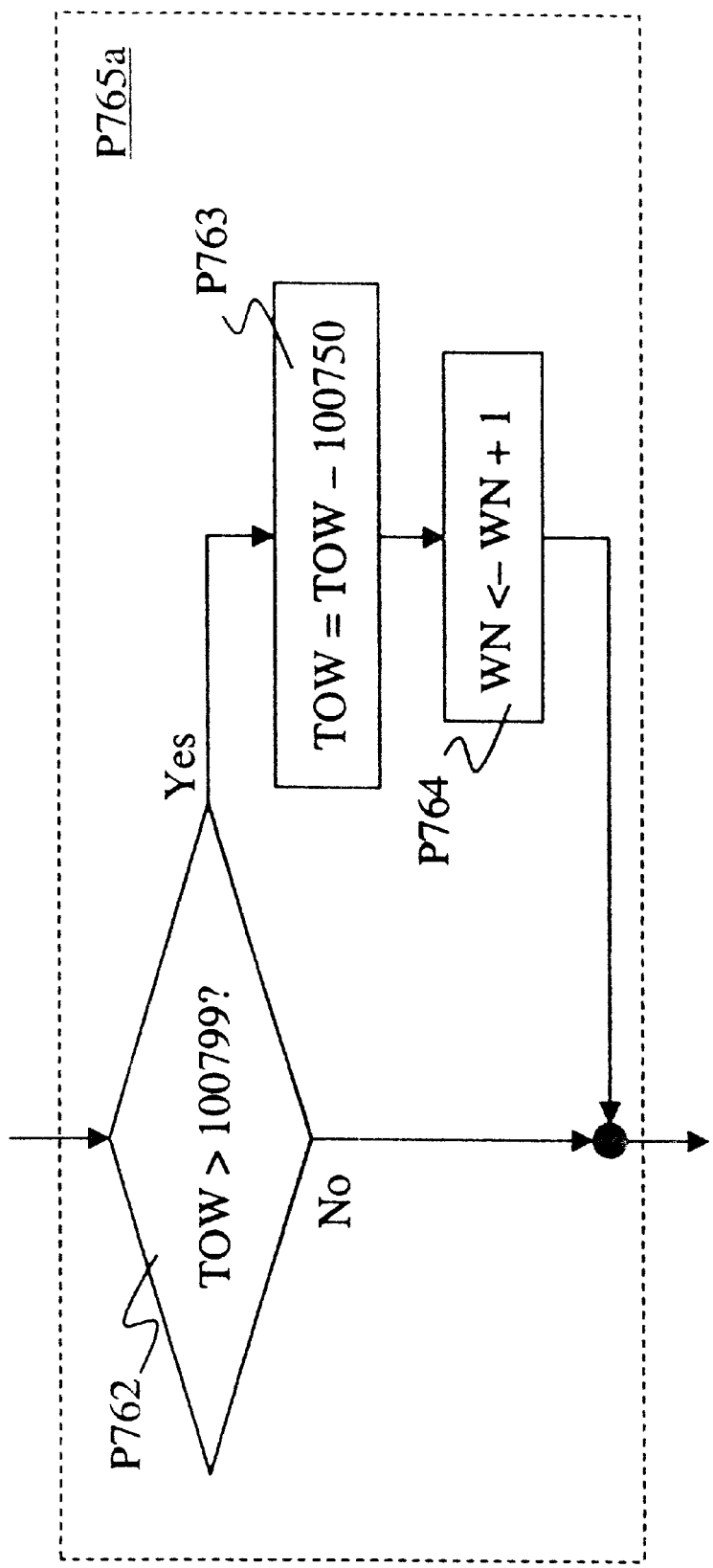
FIG. 22 is a flowchart of an implementation of a subsubtask to check and correct for week number change.

A process to correct TOW for week change is shown in task P765 in the process P760a of FIG. 21, details of which are shown in flowchart P765a in FIG. 22. The process determines whether the TOW is less than the number of seconds in a week-in task P762. If the TOW is not less than the number of seconds in a week, then the process reduces the TOW modulo to the number of seconds in a week in task P763 and increments the WIN by 1 in task P764. The process will discard the TLM and use the regular TLM instead as shown in task P770 in FIG. 21.

In task P240, the process generates the CRC for the subframe. The precess then performs an XOR scrambling operation in task P240, stores the predicted subframe at the appropriate position in the prediction buffer (e.g. as indicated by the TOW) in task P785, and sets a valid flag in task P787.

The almanac update a P600 as shown in FIG. 17 will now be explained. The process extracts the page ID. The process then determines if either the page ID is 51 or if it is a valid SV ID. The process will then extract the old and new TOWs and store the TOWs for the SV in a buffer. If the page ID is neither 51 nor is it a valid SV, then the process will pull the old new TOWs from the buffer. Then, the process proceeds to determine whether the old TOW and the last almanac update time are the same. If the old TOW and the last almanac update time are the same, then the process will reset the almanac update table; if the old TOW and the last almanac update time not the same, then the process will determine whether the new TOW and the last almanac are the same.

If the new TOW and the last almanac update time are not the same, then the process will exit and end the almanac update process. If new TOW and the last almanac update time are the same, then the process will determine whether the page ID is a valid SV ID, a dummy SV ID or if it is 51, 55 or 56. If the page ID is not a valid SV ID, a dummy SV ID or 51, 55 or 56, then the process ends. If the page ID is a valid SV ID, a dummy SV ID or 51, 55 or 56, then the process will determine whether the subframe is valid in the almanac up date table. If the subframe is not valid in the almanac update table, then the process will store the subframe in the almanac update table, set a valid flag for this subframe and ends the almanac update process and begins the subframe prediction process. If the process determines that the subframe is valid in the almanac update table, then the process will pull all valid subframes from the almanac update table and substitute words 2–10 in the predicted subframes for this SV and proceed to do the subframe prediction.

Figure 23:
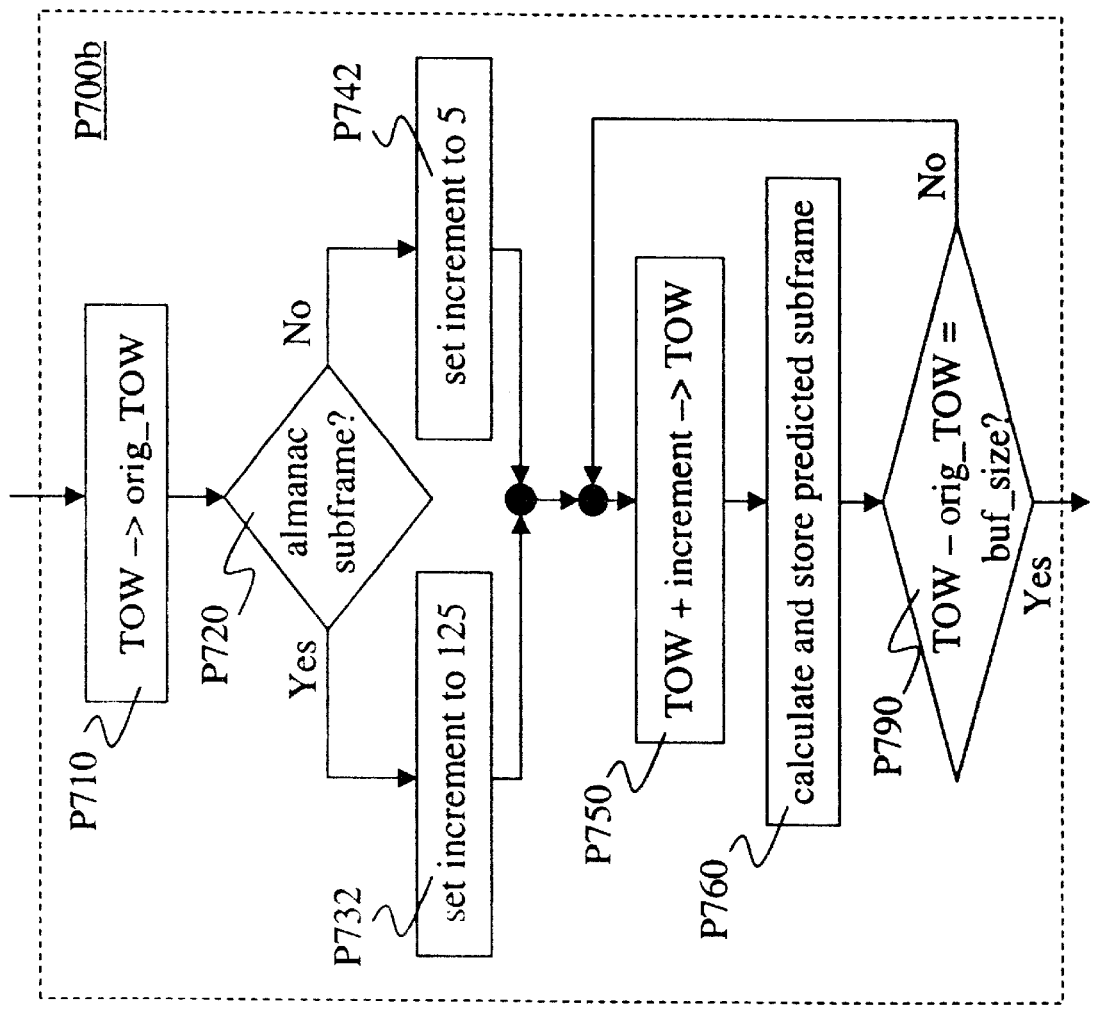
FIG. 23 is a flowchart of an implementation of a task to predict subframes.

FIG. 23 shows a process P700b in which in P710 a value for TOW is stored in orig_TOW. A determination is made in P720 whether an almanac subframe exists. If Yes, the increment is set to 125 in P732. If No, the increment is set to 5 n P742. The process proceeds in P750 where the TOW is added to the increment of P732 or P742 and scored in TOW. The predicted subframe is then calculated and stored in P760, and a determination is whether TOW minus orig_ TOW is equal the buffer size. If Yes, the flowchart P700b is completed. If No, the calculation is repeated for P750.

Based on the above considerations, an estimate on the prediction can be performed. Assuming that almanac updates occur every 20 hours, then in a given 20 hour—or 72,000 second-period, for any satellite, there will be one almanac update and 10 ephemeris updates. The outage due to the almanac update can be estimated as 318/5=64 seconds, while the outage due to the ephemeris update will be 10×18=180 seconds. In addition, during almanac updates, based on experimental data, it is expected that approximately five irregular TLM messages will occur, which are transmitted within the ephemeris subframes. This will add an additional 30 seconds of prediction error. Thus, the rate of erroneous subframe predictions can be estimated as (180+64+30)/72,000=0.38%. The experimental data shows about a 0.5% error rate. The difference is due to unpredictable irregular system messages contained in the reserved data fields, for example, classified data.

The bit prediction error rate could be estimated as one-half of the subframe error rate. This would seem reasonable if it is assumed that the bits are changed with 50% probability. This assumption, however, is invalid for two reasons. First, in an update, often only a few less significant bits are changed in the navigation data. This results in a reduced bit error rate. Second, when a word prediction is erroneous, then with 50% probability, bit 30 of the CRC will be changed, which will invert all data bits in the following word. Overall, the second effect prevails, which gives a bit error rate slightly above one-half of the subframe error rate. This is in good match with the experimental data.

Seemingly, it is an additional problem that the unknown $29^{the}$ and $30^{th}$ bits of the unpredicted subframes propagate through the XOR mechanism into the predictable part of the data. Obviously, if all four hypotheses according to all possible values of bits 29 and 30 are determined, then one of the prediction hypotheses will always be correct. Further, if it is considered that it is sufficient to predict all bits with a modulo 2 additive constant (i.e., it is okay to have all bits inverted, to get the same GPS performance), then it can be claimed that two hypotheses are sufficient. Unfortunately, every doubling of the number of hypotheses also doubles the probability of false alarm (i.e., picking the wrong timeshift/frequency in the code search). Multiple hypotheses can be dismissed altogether, however, if the bit prediction always start at subframe boundaries. This is because the second and tenth words in every subframe contain bits 23 and 24, which are determined in such a way that bits 29 and 30 of the second and tenth words are always zeros. The data sequence that follows then can be perfectly predicted.

Even if we do not start the prediction at subframe boundaries, the performance degradation of the GPS receiver due to the bit error propagation through the XOR mechanism will still be limited. This is because most of the bit errors can be modeled as a random modulation with a ±1 digital waveform that has a very low bit rate of 50 Hz/30=1.6 Hz, where 50 Hz is the navigation bit rate and the factor of 30 is the number of bits in a word. Thus, when the GPS signal detection is done in the frequency domain, then the spectra is expected to be widened by only 1.6 Hz. The discrete periodic components of the modulation spectra will be zeros because the +1 and −1 modulating error bits are equally likely.

Figure 24:
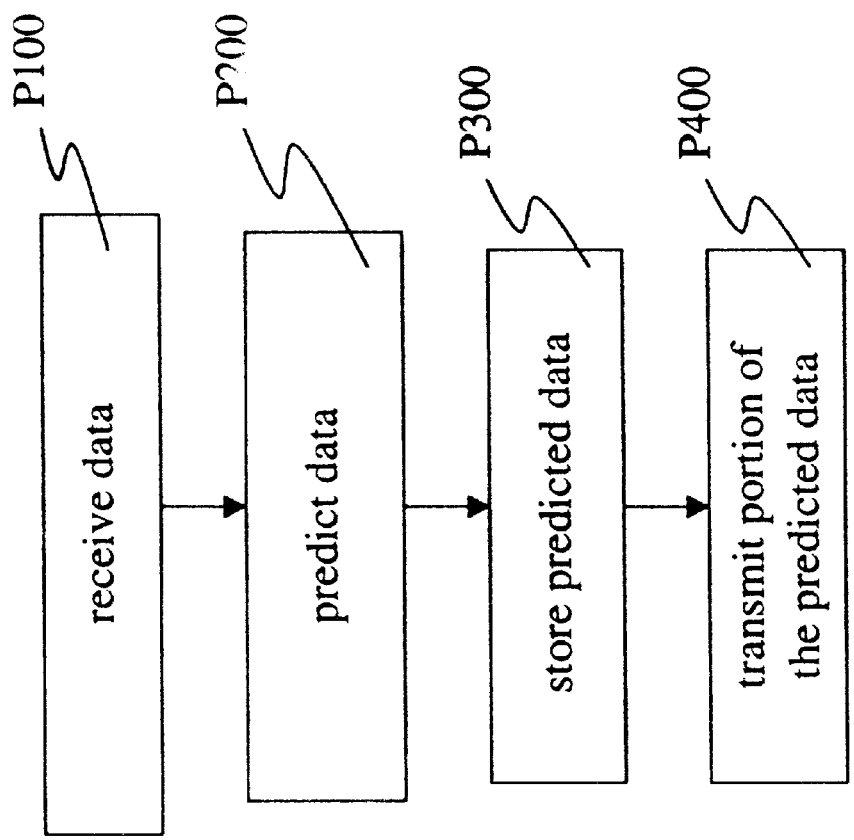
FIG. 24 is a flowchart of a method of providing predicted data according to an embodiment of the invention.

FIG. 24 shows a flow chart for a method for predicting navigation data according to another embodiment of the invention. In task P400, a portion of the predicted data is provided to a requestor. As described below, the requestor may be a GPS receiver (e.g. a mobile unit), and the predicted data may be used to support a long coherent integration period. In other embodiments, the predicting entity may push predicted data to another entity instead of (or in addition to) responding to a request for data.

In one implementation of a system according to an embodiment of the invention, predictions for word 2 of each subframe may be ignored (e.g. by the mobile unit applying the predictions) in order to avoid the TOW inaccuracy described above.

As described below, a method according to an embodiment of the invention may be applied to support position location upon request in mobile receivers. The prediction method can be implemented fully at a central site, which has access to the unobstructed satellite signals, or at the receiver side, in which case the central site only sends a minimal set of information that enables the receiver to perform the navigation data prediction.

The prediction start time and duration may be adjusted on demand, according to the terms of the requestor's query. In this manner, the overhead that would be incurred in transmitting more of the navigation data than the requester needs is avoided.

A position determining entity (PDE) may include an apparatus that performs a method of prediction as described herein. In a cellular system for mobile wireless communications, a base station may include a PDE (which may receive GPS data from or may itself include a GPS receiver). In other implementations, a base station including a PDE may receive GPS data from a reference GPS receiver which receives and forwards the data to more than one base station. Alternatively, a PDE may be located apart from the base station. In a cellular system for wireless communications, for example, a base station controller (BSC) or mobile services controller (MSC) may include the PDE rather than the base station, and such a PDE may support prediction capabilities for more than one base station. In other implementations and/or in other systems, the elements of a PDE may be found in more than one location. Note that in a system that already uses GPS signals for synchronization purposes (e.g., a CDMA cellular telephone system), it may even be possible to incorporate one or more PDEs into the existing structure.

Data from a single GPS receiver may be used to support prediction over a wide geographical area. One practical limit to the size of such an area may be keeping the set of visible SVs substantially constant over the area. If the receiver cannot see all of the SVs visible to a particular mobile unit, for example, it may not be able to supply the prediction data needed by the mobile unit to perform modulation wipeoff. In another implementation, GPS data received by receivers in different locations may be combined to provide appropriate prediction data to mobile units over a wider geographical area.

A PDE need not be constrained by geography in the same manner, and that it is possible for a single PDE to support a method of prediction as described herein over an arbitrarily large area. On the other hand, the effective distance between a PDE and an entity receiving the predicted data (e.g. a mobile unit) may be limited by the delay between the transmission of the prediction data and its reception (also called 'latency'). In some applications (e.g. in which the latency is not severe enough to affect position location accuracy), predictions may be supplied sufficiently in advance to counteract such effects of latency.

In a system according to an embodiment of the invention, a requesting entity (e.g. a mobile unit) sends a query to a PDE that comprises a request for a string of predicted data (a 'prediction string'). Several different query formats are possible. For example, the request may indicate the starting and ending times of a GPS data period for which a corresponding prediction string is desired. In another example, the request may indicate the starting time and duration of a GPS data period for which a corresponding prediction string is desired. In a further example, the starting time and/or duration of a GPS data period for which a corresponding prediction string is desired may be inferred (e.g. according to a predetermined relation) from a time at which the query is transmitted by the requestor or received by the PDE.

In a system according to an alternate embodiment of the invention, a PDE may send a prediction string to one or more entities without having received an explicit corresponding request. For example, a prediction string that corresponds to a GPS data period having a predetermined length and/or starting time may be broadcast by a PDE at predetermined intervals. In another example, transmission of a series of prediction strings according to a predetermined schedule may be initiated at least in part by a requesting entity such as a mobile unit. In a further example, initiation of the transmission of a prediction string may be determined or influenced at least in part by an event such as a registration event (e.g. upon power up of a mobile unit, movement of a mobile unit between service areas, etc.). In a further example, the characteristics of the corresponding GPS data period may be determined or influenced at least in part by environmental conditions (e.g. the service rates currently in effect (peak or off-peak), the quality of the signal received from an SV, etc.).

In an apparatus according to a further embodiment of the invention, a requesting entity such as a mobile unit includes a local GPS receiver. Information received by the local GPS receiver may be stored for offline processing. To support modulation wipeoff in this case, the mobile unit may send a request for a historical string (i.e. a string of GPS data that was received by a PDE in the past) as opposed to a prediction string. Although the processing requirements for a PDE in a system including such an apparatus may be reduced (e.g. because no prediction is required), this reduction may be offset by increased storage requirements at the requesting entity for the information received by the local GPS receiver.

In an apparatus according to a further embodiment of the invention, a requesting entity such as a mobile unit includes a local GPS receiver. Almanac information received by the local GPS receiver from a visible SV is stored in an almanac table. Information from the almanac table is then used to support modulation wipeoff on GPS signals received by the local GPS receiver from SVs that are less visible. In this manner, an accurate position and/or time determination may be obtained even though only a limited number of satellites may be visible. Note that such an apparatus may be used even without a PDE.

Note in particular a transmission link between a PDE and a requesting entity need not be wireless. For example, a PDE may include a server connected to the Internet, and a requesting entity may comprise any device connected to the Internet that may request (e.g. via a HTTP connection) and/or apply a prediction and/or historical string as described herein. For such an application, it is possible that latency would be significantly greater than might occur over an application that included a wireless connection between a base-station-based PDE and a requesting mobile unit. In another example, the prediction request and/or prediction string is transmitted over a connection that conforms to at least a portion of one or more versions of the Bluetooth™ specification.

Alternatively, the PDE may send a prediction string on its own initiative. In another implementation, a mobile unit may collect and log GPS signals on its own. These signals may be stored for processing offline. In order to perform modulation wipe-off, the mobile will need to obtain GPS data from the past. Note that no prediction is required in this case. However, this variation may be less likely to be implemented because of the increased storage requirements it imposes on the mobile unit. (Using past data for past/present/future modulation wipe-off).

In a case where the mobile unit can see one or more satellites well but not one or more others (for example, it is indoors but next to a window), the almanac data received from the visible satellite(s) may be used to predict the data received from the less visible satellite(s). In such a case, the data may be received by the mobile unit instead of a reference receiver, and the mobile unit may be a stand-alone unit that does not require a PDE.

Several different formats for the prediction string (or the historical string) are possible. When the receiver has to service frequent satellite measurement requests, then the communication overhead will be reduced if instead of sending the navigation bit prediction every time, the central site only sends the minimal amount of information that enables the receiver to perform the bit prediction. For example, the preamble, week number (WIN), TOW, subframe ID (SEID) and CRC are unnecessary to be communicated because they can be easily regenerated at the receiver if a local clock is available. A significant part of the rest of the navigation data has to be conveyed to the receiver anyway when autonomous receiver mode is to be supported.

As such, an object of a mobile unit is to measure the GPS signal phase. However, there is no direct way for the mobile unit to measure a signal phase. This is because for each possible phase delay, the mobile unit must test to see whether a correlation signal is there. There are more than 2,000 possible locations in the phase circle in a particular mobile implementation. Specifically, there are 2,046 possible locations from the 1,023 chips (in one cycle of the known code CA) with a sampling rate of two (×2). The number of locations that must be searched can be reduced, however, if it is known where or approximately where searching should take place on the phase circle.

The mobile unit thus may ask for a prediction at some point in the future. Usually, a start time of 10 seconds in the future is typical. It should be noted that the mobile unit only asks for a sequence of predicted bits when it needs it, for example, when the mobile unit has been requested to provide its position.

The request by the mobile unit contains two elements, a time at which to begin the prediction in the future, and duration of the prediction. The length of the duration is tied to the integration period. Typically, thirty phase hypotheses is provided, and the integration period is greater than 20 milliseconds. This results in a long coherent integration requiring modulation wipe-off. Typically, it takes one-half to one second for the mobile unit to test all of the phase hypotheses, depending on the mobile unit's request parameters at the time such as the time to first fix, the rate of data transfer from the base station to the mobile unit, and the processing or correlation time required.

When the receiver does a cold start, then the central site sends over all data fields, omitting the redundant parts mentioned above. The receiver stores this data in memory. The central site also keeps an up-to-date copy of the data that it sent to the receiver. The receiver can extract the ephemeris, almanac and SV health data from the received information if it works in autonomous operating mode. In any case, the bit prediction can be carried out at the receiver using the data stored in its memory. If there were no navigation data updates, then no further communication between the central site and the receiver would be necessary to sustain continuous bit prediction. When an update indeed occurs, then the central site only sends the difference (bitwise XOR) between the new data and the stored data to the receiver. The difference is transmitted using run-length coding, to further reduce the communication overhead. The receiver then updates its version of the navigation data. The central site does the same, so that it always has a precise copy of the navigation data memory content of the receiver. To maintain synchronism between the two copies of the navigation data, the receiver periodically sends checksums for all words or subframes. If there is a mismatch, then the data contents of the words or subframes in question will be retransmitted from the central site to the receiver.

In FIG. 25A, a prediction receiving entity sends a prediction request to a transmitting entity, and the prediction transmitting entity sends prediction data to the prediction receiving entity. In FIG. 25B, a prediction transmitting entity sends prediction data to a prediction receiving entity.

Figure 26:
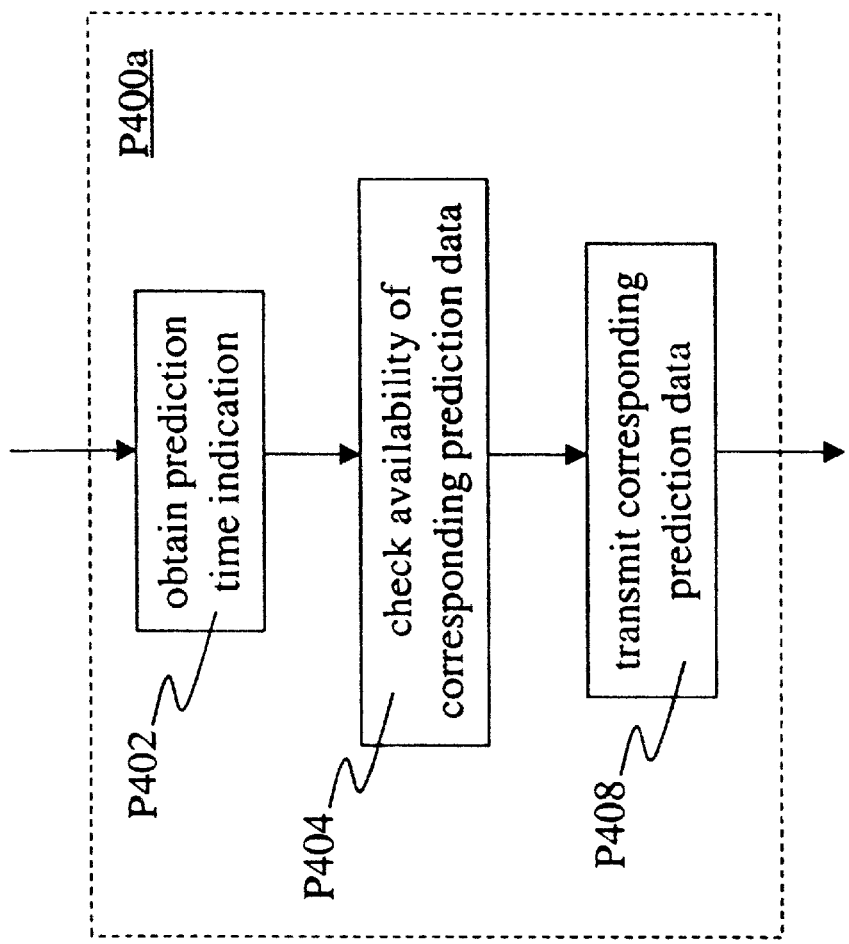
FIG. 26 is a flowchart of an implementation of a task to transmit predicted data.

In FIG. 26, a flowchart is shown in which a prediction time indication is obtained in P402. The availability of corresponding prediction data is checked in P404. The corresponding prediction data is transmitted in P408.

Figure 27A:
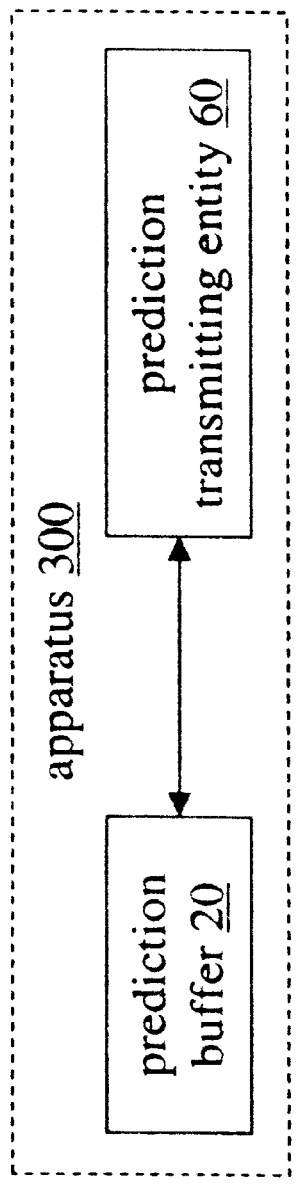
FIGS. 27A, B show block diagrams of apparatus according to embodiments of the invention.
Figure 27B:
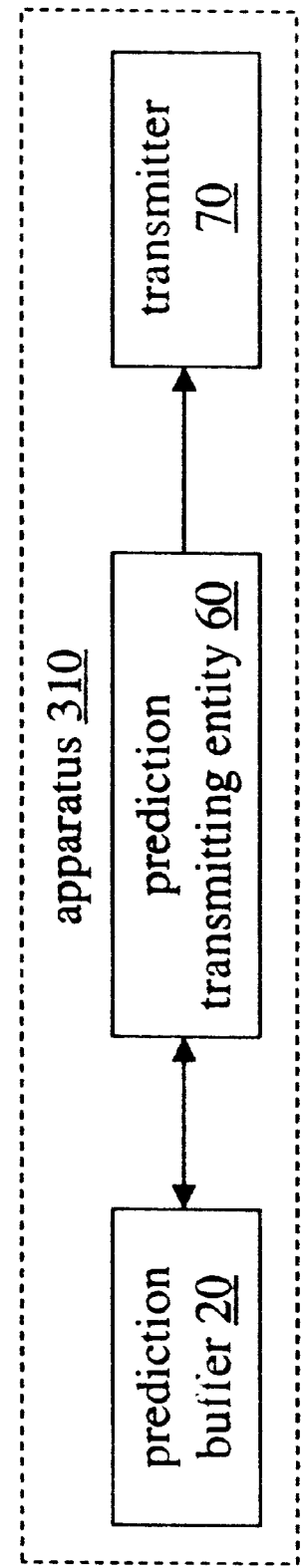

In FIG. 27A, an apparatus 300 is shown including a prediction buffer 20 in communication with a prediction transmitting entity 60. In FIG. 27B, an apparatus 310 is shown including a prediction buffer 20 in communication with a prediction transmitting entity 60, which has an output to a transmitter 70.

Figure 28A:
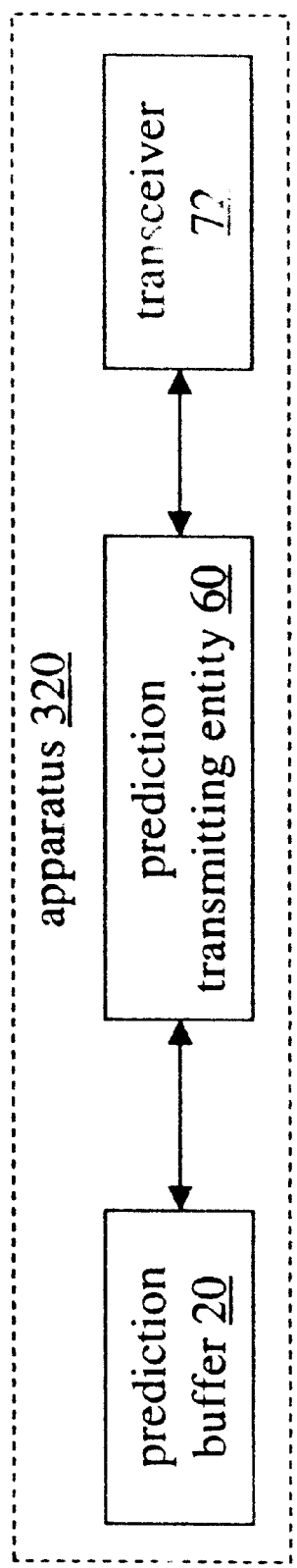
FIGS. 28A, B show block diagrams of apparatus according to embodiments of the invention.
Figure 28B:
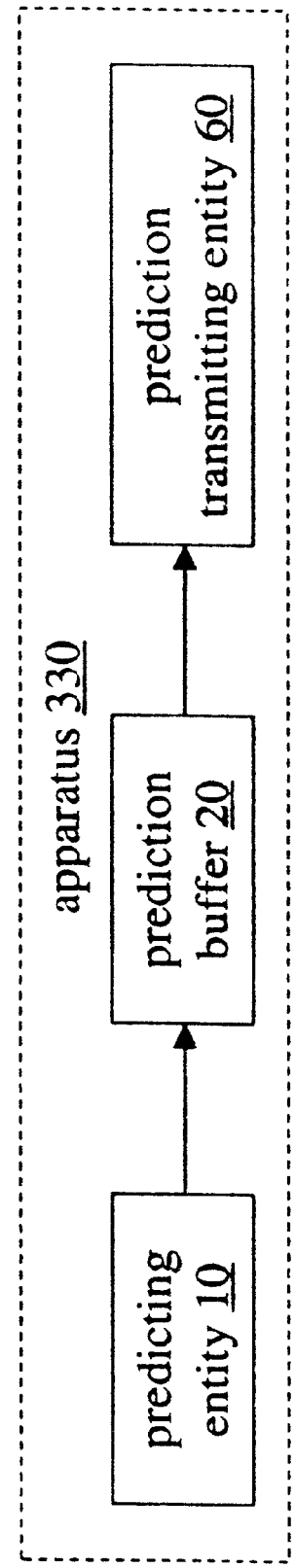

In FIG. 28A, an apparatus 320 is shown including a prediction buffer 20 in communication with a prediction transmitting entity 60, which has an output to a transceiver 72. In FIG. 28B, an apparatus 330 is shown including a prediction entity 10 having an output to a prediction buffer 20, which has an input to a prediction transmitting entity 60.

Figure 29:
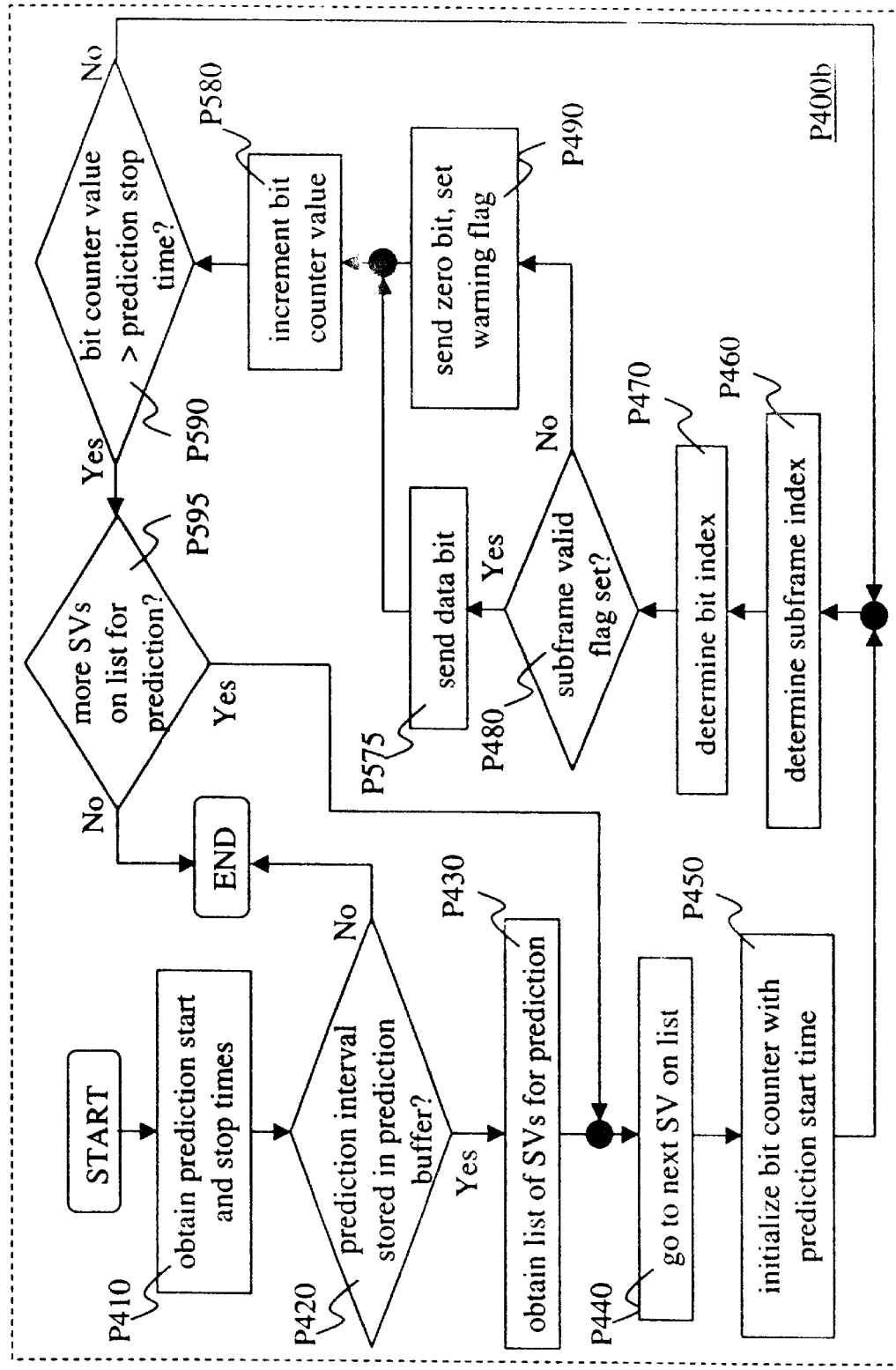
FIG. 29 is a flowchart of an implementation of a task to transmit predicted data.

In FIG. 29, a flow chart P400b is shown. After start, in P410 prediction start and stop times are obtained. In P420 a determination is made whether a prediction interval is stored in a prediction buffer. If No, the process ends. If Yes, a list of SVs for prediction is obtained in P430. From P430, the process goes to the next SV on the list in P440. The bit counter is initialized with a prediction stan me in P450. From P450, a subframe index is determined in P460. A bit index is then determined in P470. A determination is then made in P480 whether a valid subframe flag is set. If Yes, a data bit is sent in P575. If No, a zero bit is sent, and a warning flag is set in P490. After either P575 or P490, a bit counter value is incremented in P580. A determination is made whether the bit counter value is larger than the prediction stop time. If No, the process returns to the input of the P460. If Yes, a determination is made whether there are more SVs on the list for prediction in P595. If Yes, the process returns to the input of P440. If No, the process ends.

Figure 30:
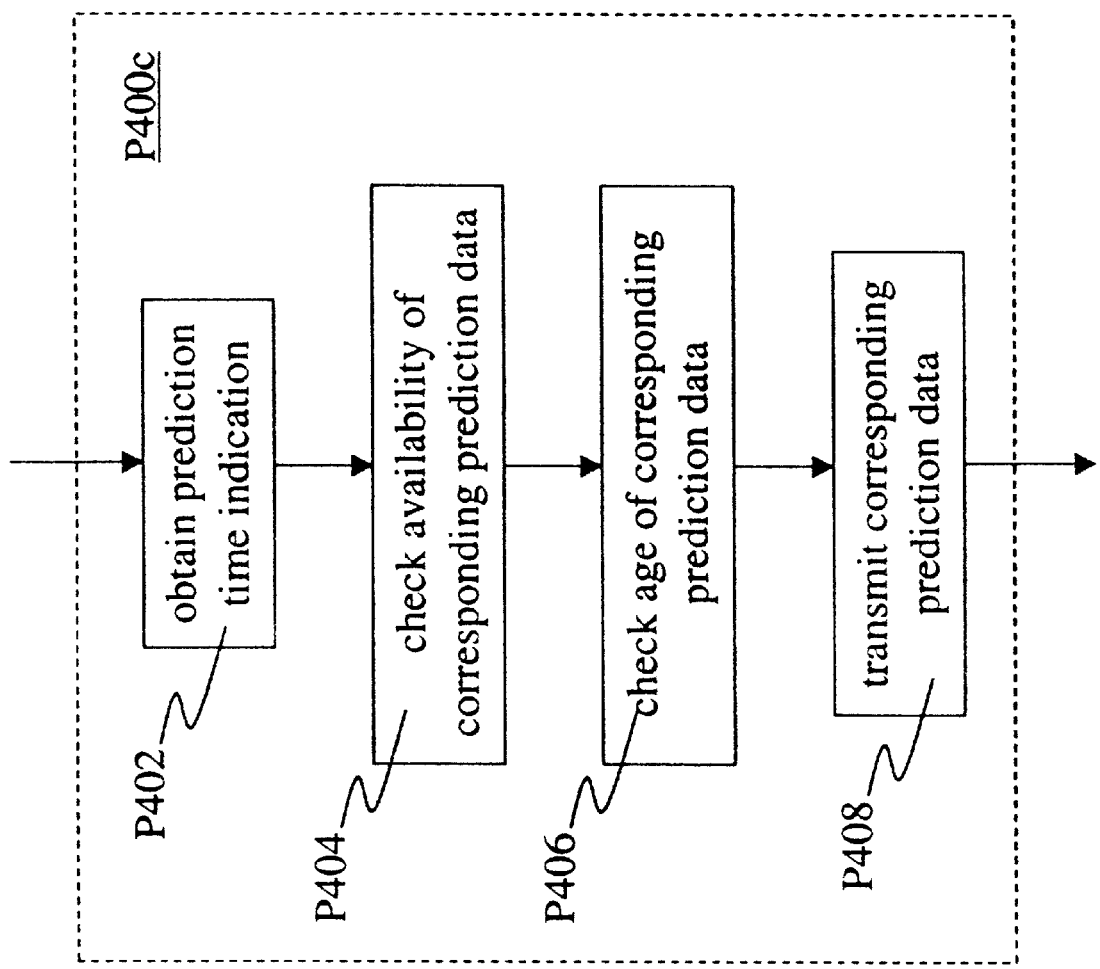
FIG. 30 is a flowchart of an implementation P400c of a task P400 to transmit predicted data.

In FIG. 30, a flowchart P400c is shown. In P402, a prediction time indication is obtained. The availability of corresponding prediction data is checked in P404. The age of corresponding prediction data is checked in P406. The corresponding prediction data is transmitted in P408.

Figure 31:
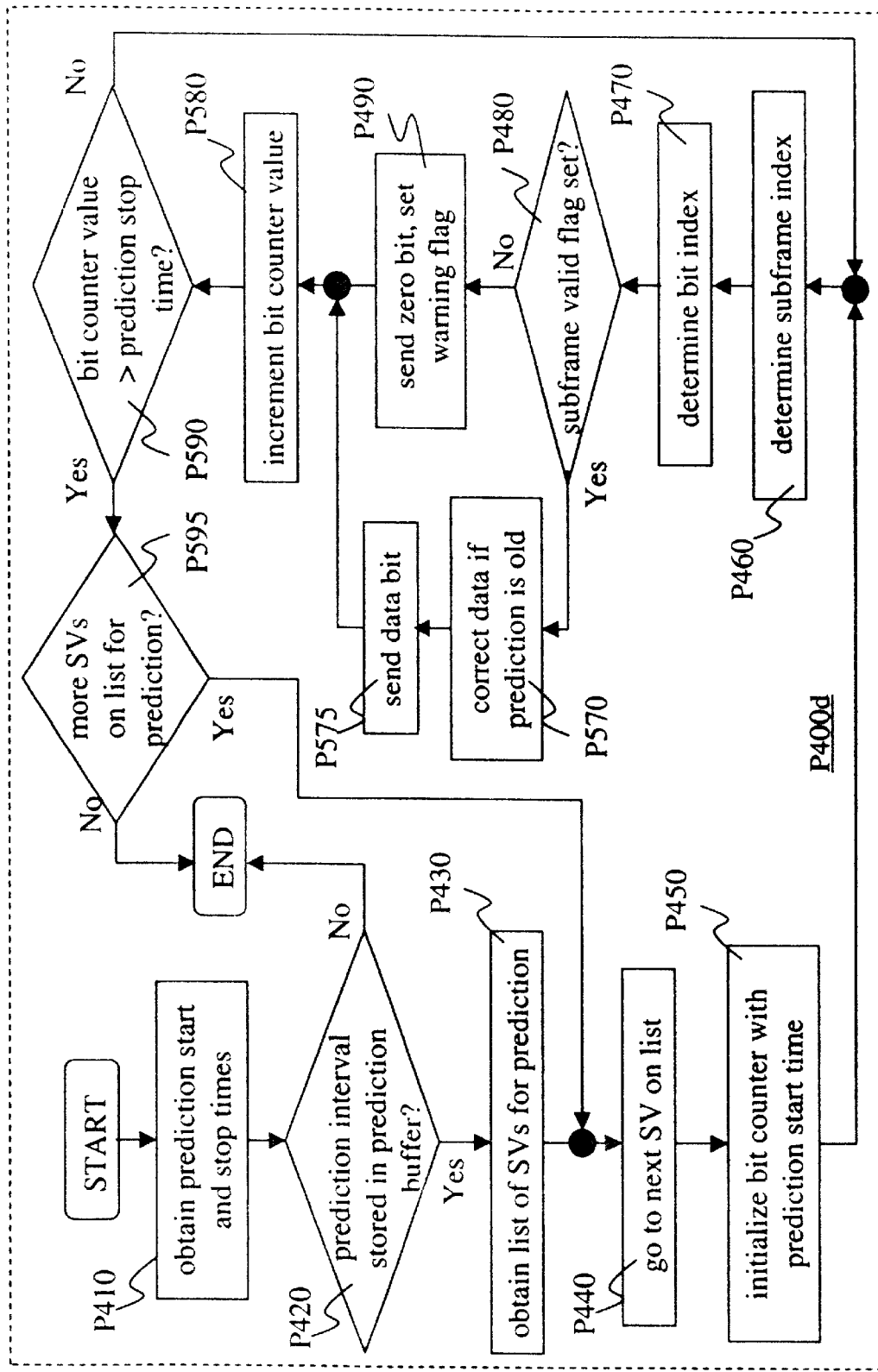
FIG. 31 is a flowchart of an implementation of a task to transmit predicted data.

A process is show in flowchart P400d in FIG. 31. After start, in P410 prediction start and stop times obtained. In P420 a determination is made whether a prediction interval is stored in a prediction buffer. If No, the process ends. If Yes, list of SVs for prediction is obtained in P430. From P430, the process goes to the next SV on the list in P440. The bit counter is initialized with a prediction start time in P450. From P450, a subframe index is determined in P460. A bit index is then determined in P470. A determination is then made in P480 whether a valid a frame flag is set. If Yes, if prediction is old, the data is corrected in P570 and a data bit is sent in P575. If No, a zero bit is sent, and a wand flag is set in P490. After either P575 or P490, a bit counter value is incremented in P580. A determination is made whether the bit counter value is larger than the prediction stop time. If No, the process returns to the input of the P460. Yes, a determination is made whether there are more SVs on the list for prediction in P595. If Yes, the process returns to the input of P440. If No, the process ends.

Figure 32:
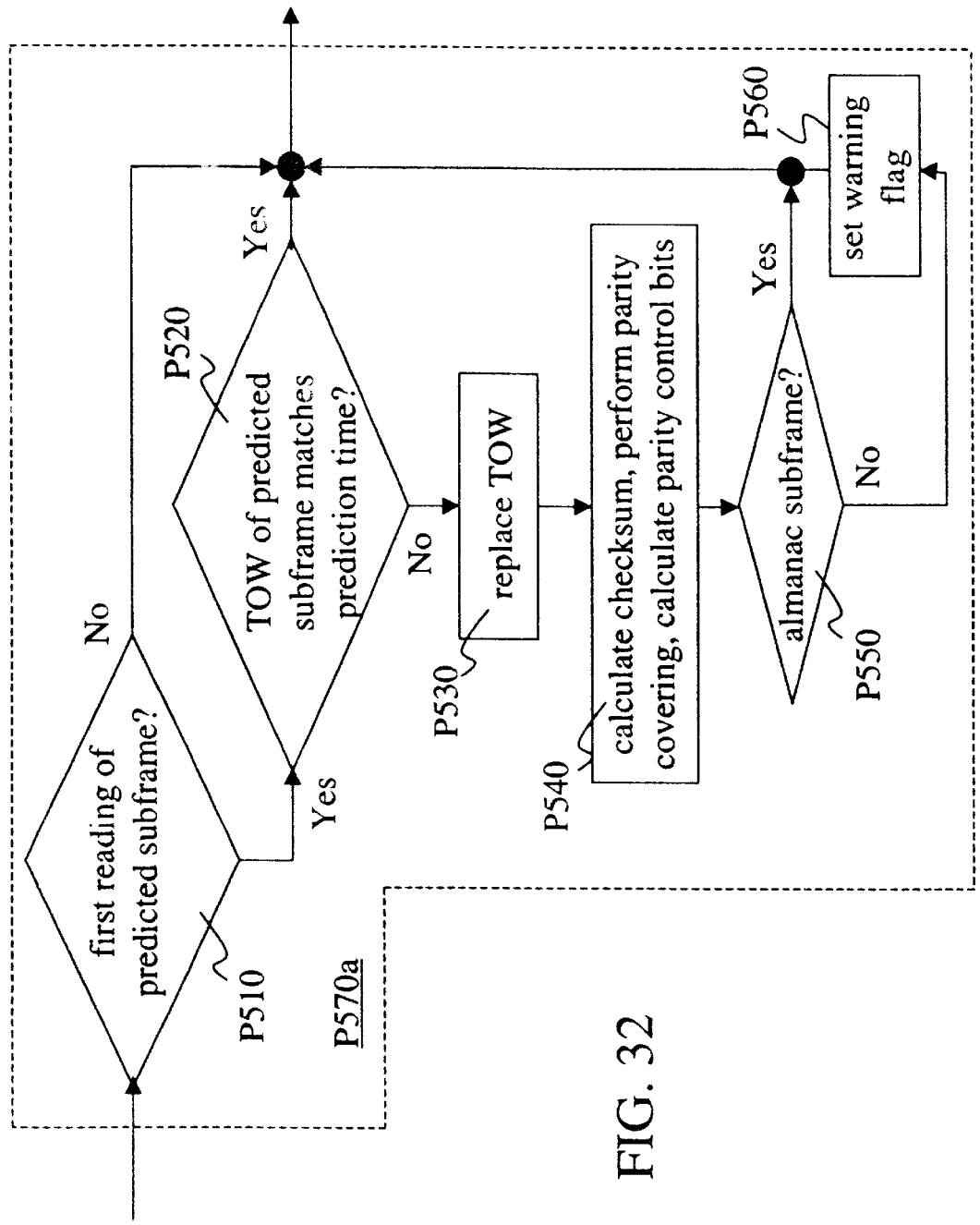
FIG. 32 is a flowchart of an implementation of a task to test and correct old predicted data.

A flowchart P570a is shown in FIG. 32. The process begins at P510 with a determination of whether a first reading of a predicted subframe has occurred. If No, the flowchart P570a exits. If Yes, in P520 a determination is made of whether the TOW of the predicted subframe matches the prediction time. If Yes, the flowchart P570a exit. If No, the TOW is replaced in P530. After P530, the checksum is calculated, the parity covering is performed, and the parity control bits are calculated in P540. A determination is then made in P550 whether an almanac subframe exists. If Yes, the flowchart p570a exits. If No, a warning flag is set in P560, and the flowchart p570a exits.

Figure 33:
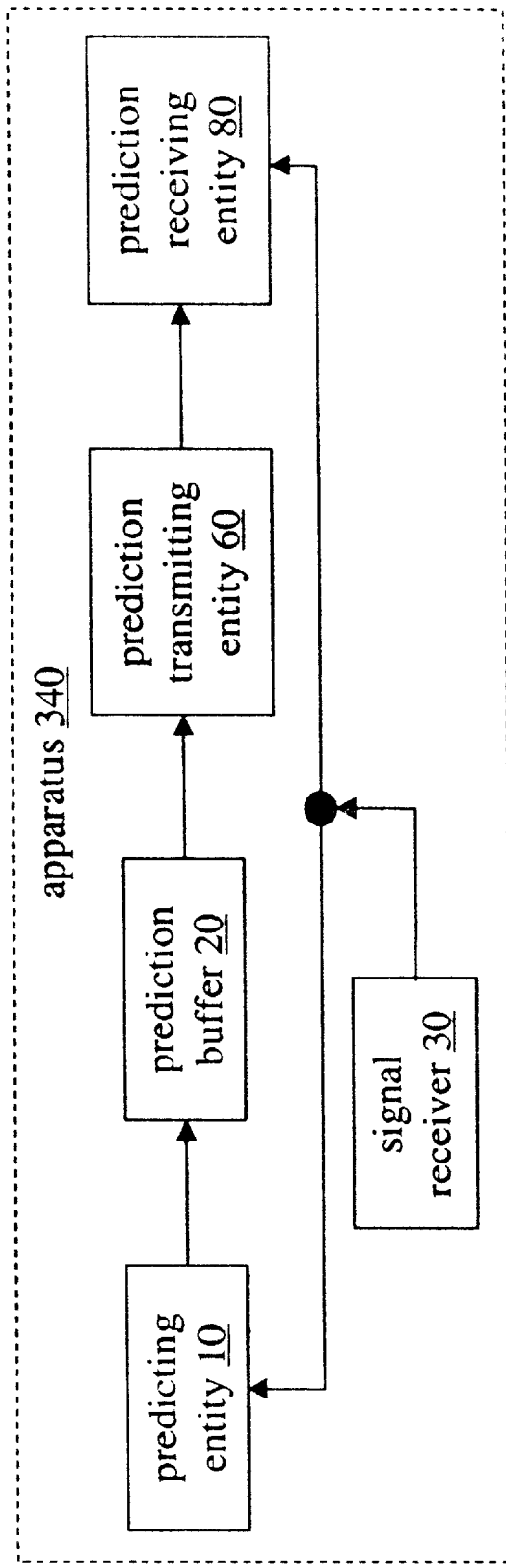
FIG. 33 shows a block diagram of an apparatus according to an embodiment of the invention.

In FIG. 33, an apparatus 340 includes a predicting entity 10 which delivers an output to a prediction buffer 20. The prediction buffer 20 delivers an output to a prediction transmitting entity 60. The prediction transmitting entity 60 delivers an output to a prediction receiving entity 80. The prediction entity 80 delivers an output to the predicting entity 80, together with an output of a signal receiver 30.

Figure 34:
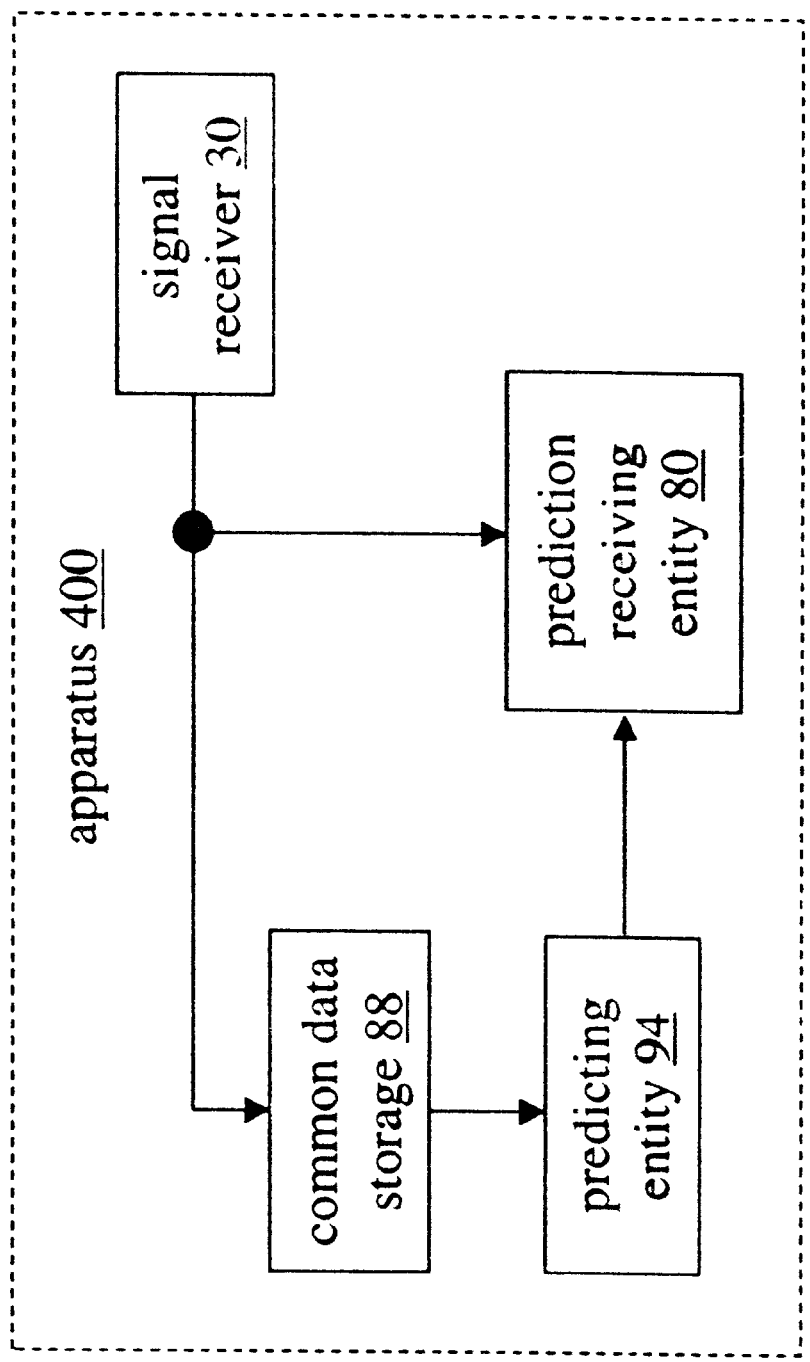
FIG. 34 shows a block diagram of an apparatus according to an embodiment of the invention.

In FIG. 34, an apparatus 400 includes a signal receiver 30 which produces outputs to common data storage 88 and to a prediction receiving entity 80. The common data storage 88 delivers an output to a predicting entity 94. The predicting entity 94 delivers an output to the prediction receiving entity 80.

Figure 35:
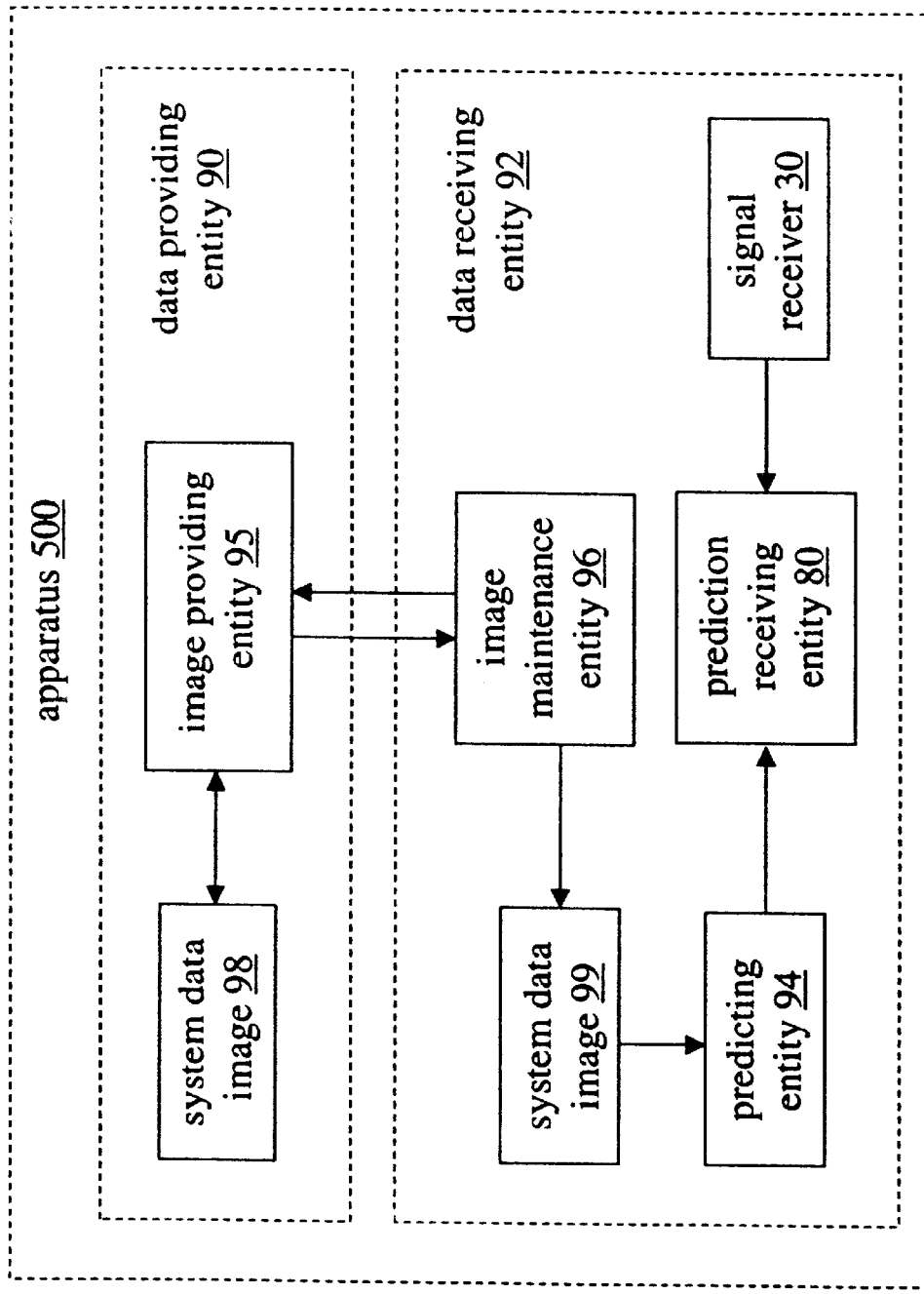
FIG. 35 shows a block diagram of an apparatus according to an embodiment of the invention.

In FIG. 35, an apparatus 500 includes a data providing entity 90 and a data receiving entity 92. The data providing entity 90 includes a system data image 98 that communicates with an image providing entity 95. The image providing entity 95 communicates with an image maintenance entity 96 in the data receiving entity 92. The image maintenance entity 96 has an output to a system data image 99 in the data receiving entity 92, which has an output to a predicting entity 94. The predicting entity 94 has an output to a prediction receiving entity 80 which also receives an output of a signal receiver 30.

The disclosed apparatus, method, and system are provided to enable any person of ordinary skill in the art to make or use the present invention. The various modifications to the disclosed apparatus, method, and system will be readily apparent to those skilled in the art, and the generic principles defined herein may be applied to other embodiments without the use of inventive faculty. Thus, the present invention is not intended to be limited to the apparatuses, methods, and systems described herein but is to be accorded the widest scope consistent with the claims set forth below.

What is claimed is:

1. A method of predicting data comprising:
   receiving data including a plurality of received subframes;
   predicting future data based on at least the received data;
   storing the predicted future data; and
   incrementing a timestamp associated with one among the plurality of received subframes by a predetermined value.

2. The method of claim 1, wherein the incrementing a timestamp associated with one among the plurality of received subframes by a predetermined value is performed before said predicting future data.

3. The method of predicting data according to claim 1, further including:
   testing a fixed string of received data; and
   correcting the tested fixed string if the test indicates that such correction is necessary.

4. The method of predicting data according to claim 3, wherein the timestamp has a predetermined maximum value, the method further including:
   detecting that the timestamp is at the predetermined maximum value; and
   correcting the timestamp in response to detecting that the timestamp is at the predetermined maximum value.

5. The method of predicting data according to claim 1, wherein the predicted future data includes parity bits, the method further including:
   recalculating the parity bits of the predicted future data based on the state of the other bits in the predicted future data.

6. The method of predicting data according to claim 1, wherein the predicted future data includes checksum bits, the method further including:
   regenerating the checksum bits of the predicted future data based on the state of the other bits in the predicted future data.

7. The method of predicting data according to claim 1, wherein storing the predicted future data includes storing the predicted future data in a predetermined location of a buffer.

8. The method of predicting data according to claim 7, wherein storing the predicted future data further includes selecting said predetermined location based on the incremented timestamp.

9. The method of claim 1, wherein the incrementing a timestamp associated with one among the plurality of received subframes by a predetermined value is performed after said storing the predicted future data.

10. The method of claim 1, wherein the incrementing a timestamp associated with one among the plurality of received subframes by a predetermined value is perform contemporaneously with at least on of said receiving, storing, and predicting.

11. A method of providing predicted data, said method comprising:
    receiving data from a transmitter;
    incrementing a timestamp associated with the received data by a predetermined value
    predicting future data based on the received data with incremented timestamp;
    storing the predicted future data to a buffer;
    receiving a prediction request defining a time interval;
    obtaining predicted future data corresponding to the time interval from the buffer; and
    transmitting the predicted future data.

12. A method comprising:
    receiving a subframe of a GPS signal;
    storing the received subframe in a buffer; and
    predicting a next corresponding subframe by changing a TOW and regenerating a CRC of the received subframe; and
    incrementing a timestamp associated with the received subframe by a predetermined value.

13. The method of claim 12, wherein the subframe predicting further comprises predicting ephemeris data by repeating ephemeris data of the received subframe in a next frame.

14. The method of claim 12, wherein the subframe predicting further comprises predicting ephemeris data by repeating ephemeris data of the received subframe in the next 50 frames.

15. The method of claim 12, wherein a regular TLM message is used in the subframe predicting.

16. The method of claim 12, wherein a list of most recent almanac data changes is kept so that the subframe predicting will include latest known almanac data.

17. The method of claim 12, wherein the subframe predicting uses old predictions.

18. An apparatus comprising:
    a processor capable of:
    receiving a subframe of a GPS signal;
    storing the received subframe in a buffer; and
    predicting a next corresponding subframe by changing a TOW and regenerating a CRC of the received subframe; and
    a memory for storing the predicted subframe.

19. The apparatus of claim 18, wherein the processor is further capable of predicting ephemeris data by repeating ephemeris data of the received subframe in a next frame.

20. The apparatus of claim 18, wherein the processor is further capable of predicting ephemeris data by repeating ephemeris data of the received subframe in the next 50 frames.

21. The apparatus of claim 18, wherein the processor uses a regular TLM message in the subframe predicting.

22. The apparatus of claim 18, wherein a last of most recent almanac data changes is kept so that the subframe predicting will include latest known almanac data.

23. The apparatus of claim 18, wherein the processor uses old predictions in the subframe predicting.

24. A method of predicting subframes of GPS signals, comprising:
    determining whether a subframe is an almanac subframe;
    setting a timehead based on whether the subframe is an almanac subframe;

adding the set timehead to TOW;

setting a TLM message based on a value at the TOW;

generating a CRC for a predicted subframe; and storing the predicted subframe in a buffer.

25. A method of predicting subframes of GPS signals of claim 24, wherein a size of the buffer may vary based on a number of predicted subframes.

26. A method of predicting subframes of GPS signals of claim 24, further comprising the step of determining whether a value of the TOW is less than a number of seconds in a week.

27. A method of predicting subframes of GPS signals of claim 24, further comprising the step of calculating a position of the predicted subframe in the buffer.

28. A method of predicting subframes of GPS signals of claim 24, further comprising the step of setting a valid flag.

29. A method of updating almanac data of an SV at a central site, comprising:

extracting a page ID of a subframe;

determining whether the page ID is valid based on a first criteria;

extracting old and new TOWs from a buffer based on the validity of the page ID based on the first criteria;

determining whether the old TOW and a last almanac update time are the same;

resetting an almanac update table based on whether the old TOW and the last almanac update time are the same;

determining whether the new TOW and the last almanac time are the same;

ending the almanac update process based on whether the new TOW and the last almanac update time are the same;

determining whether the page ID is valid based on second criteria;

ending the almanac update process based on whether the page ID is valid based on the second criteria;

determining whether the subframe is valid in the almanac update table;

storing the subframe in the almanac update table, setting a valid flag for the subframe, and beginning a subframe prediction process based on whether the subframe is valid in the almanac update table; and extracting all valid subframe from the almanac update table and substituting words 2–10 in the predicted subframes for this SV and performing the subframe prediction process based on whether the subframe is valid in the almanac update table.

30. A method of determining whether a subframe prediction is feasible at a central site, comprising:

receiving a subframe from an SV;

determining whether a certain bit of a word of the subframe is zero;

storing the subframe in a buffer if it is determined that the bit of the word is zero;

inverting all bits in the received subframe and storing them in the buffer if it is determined that the bit of the word is not zero;

determining whether a subframe header is valid;

ending the process and waiting for a next subframe based on whether the subframe header is valid;

checking CRC validity for all words;

ending the process and waiting for the next subframe based on whether the CRC for all the words is valid;

checking a TLM message to see if it is different from a last TLM message received;

setting the TLM message as a regular TLM message based on whether the TLM message is different from the last TLM received;

storing the TLM message as the last TLM message received;

determining whether there is a valid prediction for this subframe;

performing a subframe prediction based on whether there is a valid prediction for this subframe;

determining whether there received and predicted TOW match;

performing the subframe prediction based on whether the received and predicted TOW match;

determining whether the is a perfect match between the received and predicted subframes based on whether the received and predicted TOW match;

determining an errorcode and logging an error based on whether there is a perfect match between the received and the predicted subframes;

determining whether the subframe is an almanac subframe;

performing an almanac update based on whether the subframe is an almanac subframe; and performing the subframe prediction.

31. An apparatus for predicting subframes of GPS signals at a central site, comprising:

a processor capable of:

determining whether a subframe is an almanac subframe;

setting a timehead based on whether the subframe is an almanac subframe;

adding the set timehead to a TOW;

setting a TLM message based on a value of the TOW;

generating a CRC for a predicted subframe; and a memory for storing the predicted subframe.

32. An apparatus for predicting subframes of GPS signals of 31, wherein a size of the memory may vary based on a number of predicted subframes.

33. An apparatus for predicting subframes of GPS signals of claim 31, wherein the processor is further capable of determining whether the value of the TOW is less than a number of seconds in a week.

34. An apparatus for predicting subframes of GPS signals of claim 31, wherein the processor is further capable of calculating a position of the predicted subframe in the memory.

35. An apparatus for predicting subframes of GPS signals of claim 31, wherein the processor is further capable of setting a valid flag.

36. An apparatus for updating almanac data of an SV at a central site, comprising:

a memory for storing subframes; and a processor capable of:

extracting a page ID of a subframe;

determining whether the page ID is valid based on a first criteria;

extracting old and new TOWs from a buffer based on a validity of the page ID based on the first criteria;

determining whether the old TOW and a last almanac update time are the same;

resetting an almanac update table based on whether the old TOW and the last almanac update time are the same;

determining whether the new TOW and the last almanac time are the same;

ending the almanac update process based on whether the new TOW and the last almanac update time are the same;

determining whether the page ID is valid based on a second criteria;

ending the almanac update process based on whether the page ID is valid based on the second criteria;

determining whether the subframe is valid in the almanac update table;

storing the subframe in the almanac update table, setting a valid flag for the subframe, and beginning a subframe prediction it process based on whether the subframe is valid in the almanac update table; and extracting all valid subframe from the almanac update table and substituting words 2–10 in the predicted subframes for this SV and performing the subframe prediction process based on whether the subframe is valid in the almanac update table.

37. An apparatus for determining whether a subframe prediction is feasible at a central site, comprising:

a memory for storing subframes; and a processor capable of:

retrieving a subframe from the memory;

determining whether a certain bit of a word in the subframe is zero;

storing the subframe back into the memory if it is determined that the bit of the word is zero;

inverting all bits in the retrieved subframe and storing them back into the memory if it is determined that the bit of the word is not zero;

determining whether a subframe header is valid;

ending the process and waiting for a next subframe based on whether the subframe header is valid;

checking CRC validity for all words;

ending the process and waiting for the next subframe based on whether the CRC for all the words is valid;

checking a TLM message to see if it is different from a last TLM message received;

setting the TLM message as a regular TLM message based on whether the TLM message is different from the last TLM received;

storing the TLM message in the memory as the last TLM message received;

determining whether there is a valid prediction for this subframe;

performing subframe prediction based on whether there is a valid prediction for this subframe;

determining whether the received and predicted TOW match;

performing the subframe prediction based on whether the received and predicted TOW match;

determining whether there is a perfect match between the received and predicted subframes based on whether the received and predicted TOW match;

determining an errorcode and logging an error based on whether there is a perfect match between the received and the predicted subframes;

determining whether the sub frame is an almanac subframe;

performing an almanac update based on whether the subframe is an almanac subframe; and performing the subframe prediction.

38. A system comprising:

a receiver to receiver GPS signals and to transmit information;

a processor capable of:

receiving the information from the receiver including a subframe of a GPS signal;

storing the receive subframe in a buffer; and predicting a next corresponding subframe by changing a TOW and regenerating a CRC of the received subframe; and a memory for storing the predicted subframe.

* * * * *